US012560883B2

(12) United States Patent
Maeda

(10) Patent No.: US 12,560,883 B2
(45) Date of Patent: Feb. 24, 2026

(54) IMAGE FORMING APPARATUS, IMAGE MISALIGNMENT CORRECTION METHOD, AND NON-TRANSITORY RECORDING MEDIUM

(71) Applicant: Katsuhiko Maeda, Kanagawa (JP)

(72) Inventor: Katsuhiko Maeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/485,654

(22) Filed: Oct. 12, 2023

(65) Prior Publication Data

US 2024/0160143 A1 May 16, 2024

(30) Foreign Application Priority Data

Nov. 11, 2022 (JP) ................................ 2022-181111

(51) Int. Cl.
*G03G 15/00* (2006.01)
*G03G 15/01* (2006.01)

(52) U.S. Cl.
CPC ..... *G03G 15/6567* (2013.01); *G03G 15/5058* (2013.01); *G03G 15/0136* (2013.01)

(58) Field of Classification Search
CPC ................................................ G03G 15/0136
See application file for complete search history.

(56) References Cited

U.S. PATENT DOCUMENTS 8,913,932 B2 * 12/2014 Akamatsu .......... G03G 15/5058 399/97
9,223,273 B1 * 12/2015 Fuse .................. G03G 15/5041
9,952,526 B2 * 4/2018 Omura ............... G03G 15/5058
10,732,555 B2 * 8/2020 Maeda ............... G03G 15/0131
2004/0070661 A1 4/2004 Maeda
2007/0210245 A1 9/2007 Maeda
2008/0170892 A1 * 7/2008 Park .................. H04N 1/00031 399/301
2010/0238261 A1 9/2010 Maeda
2011/0228030 A1 9/2011 Maeda
(Continued)

FOREIGN PATENT DOCUMENTS

JP 2011-007853 A 1/2011
JP 2014-178385 A 9/2014
JP 2021-086115 A 6/2021

*Primary Examiner* — Arlene Heredia
(74) *Attorney, Agent, or Firm* — IPUSA, PLLC

(57) ABSTRACT

An image forming apparatus includes image bearers including a first image bearer and a second image bearer and circuitry that corrects misalignment of images developed on the image bearers, transferred to a transfer member, and detected by a detector. The circuitry sequentially executes a first correction process and a second correction process. The first correction process includes correcting misalignment in relation to images developed on the first image bearer based on images developed on a first group of image bearers of the image bearers. The first group of image bearers includes the first image bearer and the second image bearer. The second correction process includes correcting misalignment in relation to images developed on the second image bearer based on images developed on a second group of image bearers of the image bearers. The second group of image bearers excludes the first image bearer and includes the second image bearer.

8 Claims, 17 Drawing Sheets

(56) References Cited

U.S. PATENT DOCUMENTS

| | | | | |
|---|---|---|---|---|
| 2014/0063168 | A1 | 3/2014 | Maeda et al. | |
| 2014/0168343 | A1 | 6/2014 | Suzuki et al. | |
| 2014/0198469 | A1 | 7/2014 | Basho et al. | |
| 2015/0054902 | A1 | 2/2015 | Maeda et al. | |
| 2023/0375954 | A1* | 11/2023 | Igo ..................... | G03G 15/0105 |

* cited by examiner

IMAGE FORMING APPARATUS, IMAGE MISALIGNMENT CORRECTION METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2022-181111, filed on Nov. 11, 2022, in the Japan Patent Office, the entire disclosure of which is hereby incorporated by reference herein.

BACKGROUND

Technical Field

Embodiments of this disclosure relate to an image forming apparatus, an image misalignment correction method, and a non-transitory recording medium.

Related Art

There is a technique of forming a particular pattern image for each of a plurality of colors before image formation and detecting the formed pattern image with a detector to perform color misalignment correction for each of the plurality of colors in relation to a particular reference color.

There is also a technique in which when an image forming apparatus is switched to a print mode not using the particular reference color, the color misalignment correction is performed based on misalignment between pattern images formed for a plurality of colors for use in the image formation.

SUMMARY

In one embodiment of this invention, there is provided an image forming apparatus that includes, for example, a plurality of image bearers, a plurality of optical writing devices, a plurality of developing devices, a transfer member, a detector, and circuitry. The plurality of image bearers include a first image bearer and a second image bearer different from the first image bearer. The plurality of optical writing devices irradiate the plurality of image bearers with a plurality of light beams to write a plurality of latent images on the plurality of image bearers. The plurality of developing devices develop the plurality of latent images written on the plurality of image bearers into a plurality of images. The plurality of images developed by the plurality of developing devices are transferred to the transfer member. The detector detects the plurality of images on the transfer member. The circuitry corrects misalignment of the plurality of images based on a result of the detection. The circuitry sequentially executes a first correction process and a second correction process. The first correction process includes correcting misalignment in relation to a plurality of images developed on the first image bearer based on a plurality of images developed on a first group of image bearers of the plurality of image bearers. The first group of image bearers includes the first image bearer and the second image bearer. The second correction process includes correcting misalignment in relation to a plurality of images developed on the second image bearer based on a plurality of images developed on a second group of image bearers of the plurality of image bearers. The second group of image bearers excludes the first image bearer and includes the second image bearer.

In one embodiment of this invention, there is provided an image misalignment correction method performed by an image forming apparatus. The image forming apparatus includes a plurality of image bearers, a plurality of optical writing devices, a plurality of developing devices, and a transfer member. The plurality of image bearers include a first image bearer and a second image bearer different from the first image bearer. The plurality of optical writing devices irradiate the plurality of image bearers with a plurality of light beams to write a plurality of latent images on the plurality of image bearers. The plurality of developing devices develop the plurality of latent images written on the plurality of image bearers into a plurality of images. The plurality of images developed by the plurality of developing devices are transferred to the transfer member. The image misalignment correction method includes, for example, detecting the plurality of images on the transfer member and correcting misalignment of the plurality of images based on a result of the detecting. The correcting includes first correcting and second correcting, which are sequentially executed. The first correcting includes correcting misalignment in relation to a plurality of images developed on the first image bearer based on a plurality of images developed on a first group of image bearers of the plurality of image bearers. The first group of image bearers includes the first image bearer and the second image bearer. The second correcting includes correcting misalignment in relation to a plurality of images developed on the second image bearer based on a plurality of images developed on a second group of image bearers of the plurality of image bearers. The second group of image bearers excludes the first image bearer and includes the second image bearer.

In one embodiment of this invention, there is provided a non-transitory recording medium storing a plurality of instructions which, when executed by one or more processors forming the above-described image forming apparatus, causes the processors to perform the above-described image misalignment correction method.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
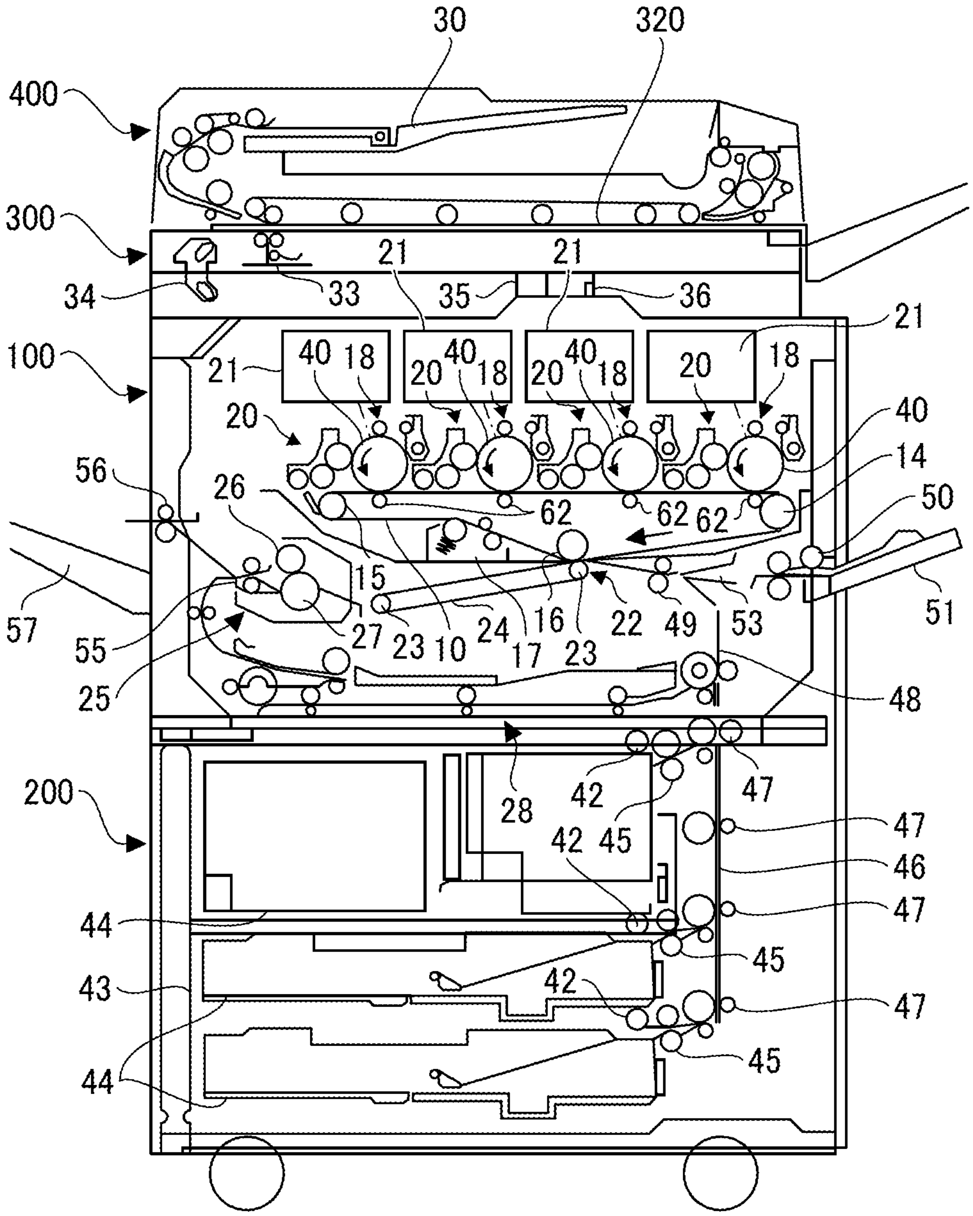
FIG. 1 is a schematic diagram illustrating a configuration example of an image forming apparatus according to a first embodiment of the present invention.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Each of the following embodiments includes a correction unit (means) that corrects misalignment of images written on a plurality of image bearers based on a result of detecting images on a transfer member. The plurality of image bearers include a first group of image bearers and a second group of image bearers. The first group of image bearers includes a first image bearer and a second image bearer different from the first image bearer. The second group of image bearers excludes the first image bearer and includes the second image bearer.

The correction unit of the embodiment sequentially executes a first correction process and a second correction process. In the first correction process, based on a plurality of images developed on the first group of image bearers of the plurality of image bearers, the correction unit corrects misalignment in relation to a plurality of images developed on the first image bearer. In the second correction process, based on a plurality of images developed on the second group of image bearers of the plurality of image bearers, the correction unit corrects misalignment in relation to a plurality of images developed on the second image bearer. The correction unit of the embodiment may further execute a misalignment correction process other than the first correction process and the second correction process.

Even if an image forming apparatus is switched to a print mode not using a particular reference color, therefore, the image forming apparatus is able to execute image formation without causing misalignment in an image formed before the correction.

A description will be given of some terms used in the embodiments.

The term "print mode" refers to information indicating whether to execute the image formation with a particular reference color. In the embodiments, a print mode for executing the image formation with the reference color will be referred to as the first print mode, and a print mode for executing the image formation without the reference color will be referred to as the second print mode.

The term "color misalignment" collectively refers to misalignment in a main scanning direction, magnification error in the main scanning direction, and misalignment in a sub-scanning direction in images of a plurality of colors forming an image of the plurality of colors. Further, the term "color misalignment correction" refers to correcting the respective positions of images of the plurality of colors (i.e., correction toner images of the plurality of colors) developed on a plurality of image bearers (e.g., photoconductor drums) of the image forming apparatus to eliminate the color misalignment in a color image recorded on a recording medium, for example. In the present specification, the term "misalignment" of the images of the plurality of colors forming the color image may be used as a synonym for the term "color misalignment." Further, the term "misalignment correction" of the images of the plurality of colors may be used as a synonym for the term "color misalignment correction."

The term "main scanning direction" refers to a direction in which a light beam scanner scans a surface of a photoconductor drum with a light beam. The main scanning direction corresponds to a direction along the rotation axis of the photoconductor drum.

The term "sub-scanning direction" refers to a direction perpendicular to the main scanning direction. The sub-scanning direction corresponds to the moving direction of an intermediate transfer belt or a second transfer belt.

The term "magnification in the main scanning direction" refers to the imaging magnification in the main scanning direction of an image formed on the photoconductor drum through a scanning lens. Further, the term "magnification error in the main scanning direction" refers to the error of the magnification in the main scanning direction due to variations in characteristics of the scanning lens, such as the refractive index and the surface shape of the scanning lens.

The term "correction toner image" refers to a toner image used for the misalignment correction. The correction toner image is an example of a pattern image. The correction toner image in the embodiments is a toner image formed on the intermediate transfer belt or the second transfer belt.

In the embodiments, the terms "image formation" and "printing" are synonymous.

In the following description of the embodiments, a tandem-type electrophotographic image forming apparatus including a second transfer mechanism will be described as an example. The image forming apparatus is a multifunction peripheral/printer/product (MFP) equipped with multiple functions, such as a copy function, a print function, and a facsimile (FAX) function, included in a single housing.

A description will be given of an example of the general arrangement of an image forming apparatus 100 according to a first embodiment of the present invention.

FIG. 1 is a diagram illustrating an example of the general arrangement of the image forming apparatus 100. The image forming apparatus 100 includes, at the center thereof, an intermediate transfer device that includes an intermediate transfer belt 10, which is an endless belt. The intermediate transfer belt 10 is stretched around a first support roller 14, a second support roller 15, and a third support roller 16, and is driven to rotate clockwise.

Figure 2:
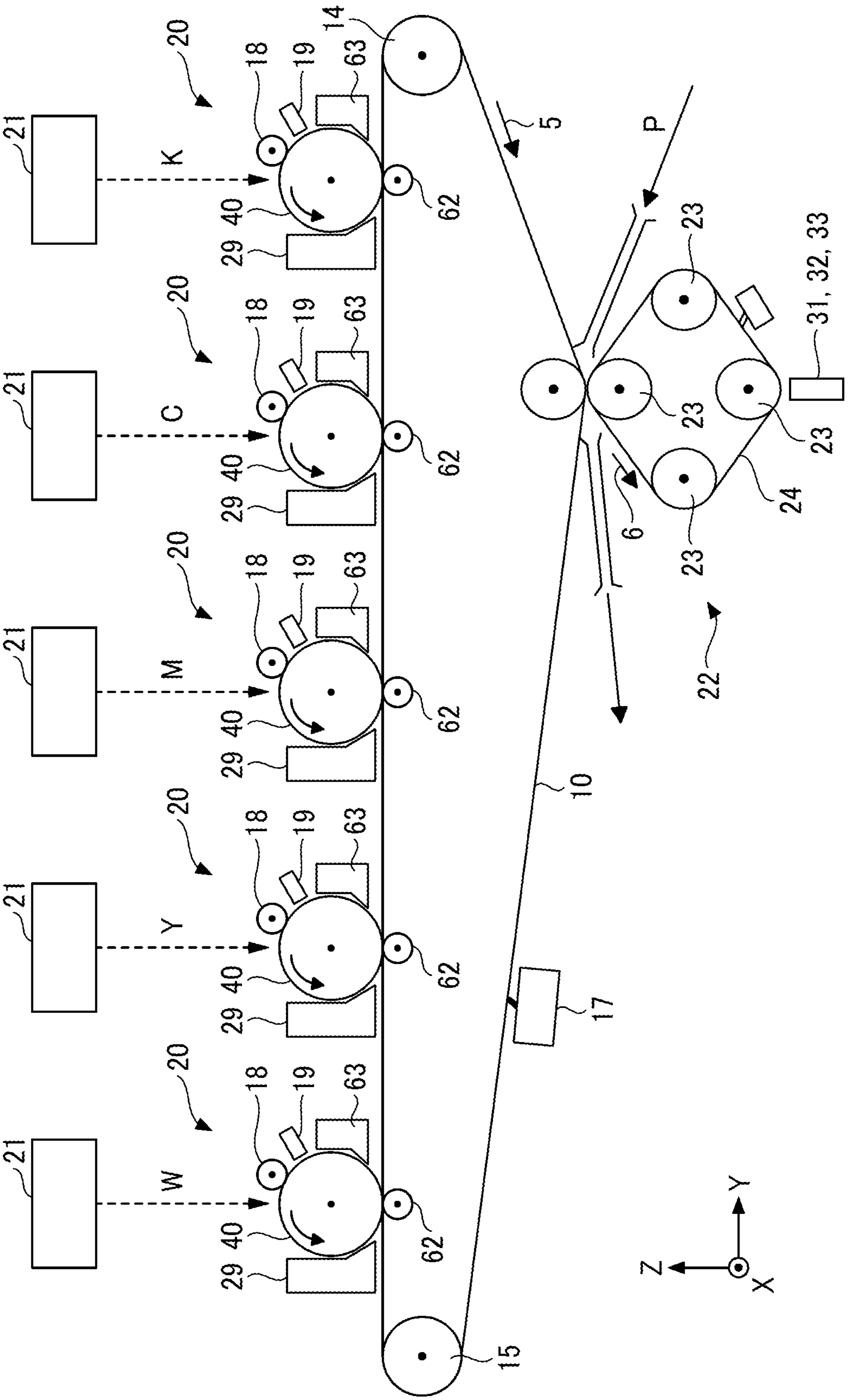
FIG. 2 is a diagram illustrating a configuration example of image forming devices included in the image forming apparatus of the first embodiment.

The image forming apparatus 100 further includes, to the right of the second support roller 15, an intermediate transfer member cleaning device 17 that removes residual toner remaining on the intermediate transfer belt 10 after the transfer of a toner image to a recording medium P (see FIG. 2).

The image forming apparatus 100 further includes image forming devices 20 which include an image forming device 20 for forming a yellow (Y) image, an image forming device 20 for forming a magenta (M) image, an image forming device 20 for forming a cyan (C) image, and an image forming device 20 for forming a black (K) image. The image forming devices 20 for the respective colors face a part of the intermediate transfer belt 10 disposed between the first support roller 14 and the second support roller 15, and are juxtaposed along the moving direction of the intermediate transfer belt 10.

The image forming devices 20 for the respective colors are similar in configuration except for the difference in the color of the toner used therein. In the following description and drawings, therefore, the letters Y, M, C, and K representing the colors of the toner used in the image forming devices 20 will be omitted where appropriate. The image forming apparatus 100 further includes an image forming device 20 for forming a white (W) image, which is located upstream of the image forming device 20 for forming the Y image in the moving direction of the intermediate transfer belt 10. The image forming device 20 for forming the W image is omitted in FIG. 1 but is illustrated in FIG. 2.

Each of the image forming devices 20 includes a photoconductor drum 40, a charging device 18, a developing device (developing means), and a cleaning device for the corresponding color. The image forming devices 20 are removably installed in the image forming apparatus 100. The photoconductor drum 40 is an example of an image bearer.

The image forming apparatus 100 further includes a plurality of light beam scanners 21 above the image forming devices 20. The light beam scanners 21 irradiate the photoconductor drums 40 for the respective colors with light beams (e.g., laser beams) for the image formation to form electrostatic latent images (hereinafter simply referred to as the latent images) on the photoconductor drums 40 for the respective colors in accordance with image data. The light beam scanners 21 are an example of optical writing devices (optical writing means).

The latent images on the photoconductor drums 40 for the respective colors are developed into toner images of the respective colors by the developing devices. The developed toner images of the respective colors are first-transferred onto the intermediate transfer belt 10 to be superimposed upon each other. Thereby, a color toner image is formed on the intermediate transfer belt 10. The color toner image is then carried and moved (i.e., transported) by the intermediate transfer belt 10 along the moving direction of the intermediate transfer belt 10. The configuration of the image forming devices 20 will be described in more detail later with FIG. 2.

The image forming apparatus 100 further includes a second transfer device 22 under the intermediate transfer belt 10. In the second transfer device 22, a second transfer belt 24 as an endless belt is stretched around a plurality of rollers 23. The number of the rollers 23 is two in FIG. 1, but is not limited thereto, as illustrated in FIG. 2. The second transfer device 22 is arranged to lift and press the intermediate transfer belt 10 against the third support roller 16. With the second transfer belt 24, the color toner image formed on the intermediate transfer belt 10 is second-transferred onto the recording medium P. The intermediate transfer belt 10 and the second transfer device 22 are examples of the transfer member.

The image forming apparatus 100 further includes a fixing device 25 to one side of the second transfer device 22. The recording medium P with the color toner image second-transferred thereto is transported to the fixing device 25, and the fixing device 25 fixes the color toner image on the recording medium P. The fixing device 25 includes a fixing roller 26 and a pressure roller 27. With the heat and pressure applied by the fixing roller 26 and the pressure roller 27, the color toner image transferred to a surface of the recording medium P is fixed thereon.

The image forming apparatus 100 further includes a sheet reversing device 28 below the second transfer device 22 and the fixing device 25. The sheet reversing device 28 reverses and transports the recording medium P to form an image on a rear surface of the recording medium P immediately after an image is formed on a front surface of the recording medium P.

A series of operations performed in the image forming apparatus 100 to form an image on the recording medium P will be described.

If a document is placed on a document feed tray 30 of an automatic document feeder (ADF) 400 and a copy start button included in an operation device of the image forming apparatus 100 is pressed, the image forming apparatus 100 causes the ADF 400 to transport the document to a contact glass 320. If the document is not placed on the document feed tray 30 but is manually placed on the contact glass 320, the image forming apparatus 100 drives an image reading device 300 to read the document. The image reading device 300 includes a first carriage 33 and a second carriage 34.

In the image reading device 300, a light source included in the first carriage 33 irradiates the contact glass 320 with light. Then, reflected light from a surface of the document on the contact glass 320 is reflected by a minor of the first carriage 33 toward the second carriage 34, and is further reflected by mirrors of the second carriage 34. The reflected light from the surface of the document is then formed into an image on an imaging surface of a charge coupled device (CCD) 36 as a reading sensor through an image forming lens 35. The CCD 36 captures the image of the surface of the document. Then, based on image signals of the image captured by the CCD 36, image data of the colors W, Y, M, C, and K is generated.

In response to pressing of a print start button, in response to receipt of an image forming instruction from an external apparatus such as a personal computer (PC), or in response to receipt of a FAX output instruction, the image forming apparatus 100 starts driving the intermediate transfer belt 10 to rotate, and prepares the devices included in the image forming devices 20 for the image formation.

The image forming apparatus 100 then starts the image forming process of forming the images of the respective colors. Each of the photoconductor drums 40 for the respective colors is irradiated with a laser beam modulated based on the image data of the corresponding color. Thereby, the latent images are formed on the photoconductor drums 40. Then, the toner images of the respective colors developed from the latent images are superimposed upon each other on the intermediate transfer belt 10 to form one toner image.

Then, the recording medium P is transported to the second transfer device 22 with appropriate timing such that a leading edge of the recording medium P enters the second transfer device 22 when a leading edge of the toner image on the intermediate transfer belt 10 enters the second transfer device 22. The second transfer device 22 then second-transfers the toner image on the intermediate transfer belt 10 onto the recording medium P. The recording medium P with the toner image second-transferred thereto is transported to the fixing device 25, which fixes the toner image on the recording medium P.

A description will be given of the feeding of the recording medium P to a second transfer position at which the second transfer is performed.

In a sheet feeding device 200, one of a plurality of sheet feed rollers 42 is driven to rotate to feed recording media P from one of a plurality of sheet feed trays 44 included in a sheet feeding section 43. Then, one of the recording media P is separated from the remaining recording media P by a corresponding separation roller 45, sent to a transport roller section 46, and transported by one or more transport rollers 47. The recording medium P is then guided to a transport roller section 48 of the image forming apparatus 100 and hit against a registration roller 49 of the transport roller section 48 to be temporarily stopped. Then, the recording medium P is transported to the second transfer device 22 with appropriate timing for the second transfer, as described above.

Alternatively, the recording medium P may be fed by a user; the user may place the recording medium P on a manual feed tray 51. If recording media P are placed on the manual feed tray 51 by the user, the image forming apparatus 100 drives a sheet feed roller 50 to rotate to separate one of the recording media P on the manual feed tray 51 from the remaining recording media P and bring the separated recording medium P into a manual sheet feed path 53. Then, in a similar manner as described above, the recording medium P is hit against the registration roller 49 to be temporarily stopped, and is transported to the second transfer device 22 with the above-described timing for the second transfer.

The recording medium P subjected to the fixing process and ejected from the fixing device 25 is guided to an ejection roller 56 by a switching claw 55, and is ejected by the ejection roller 56 to be stacked on a sheet ejection tray 57. Alternatively, the recording medium P is guided to the sheet reversing device 28 by the switching claw 55. The recording medium P is then reversed and guided back to the second transfer position by the sheet reversing device 28. Thereafter, an image is formed on the rear surface of the recording medium P, and the recording medium P is ejected onto the sheet ejection tray 57 by the ejection roller 56.

After the image transfer, the residual toner remaining on the intermediate transfer belt 10 is removed by the intermediate transfer member cleaning device 17 to prepare the intermediate transfer belt 10 for the next image formation.

The image forming apparatus 100 thus forms a color image on the recording medium P.

A configuration example of the image forming devices 20 of the image forming apparatus 100 will be described with FIG. 2.

FIG. 2 is a diagram illustrating a configuration example of the image forming devices 20 of the image forming apparatus 100. The image forming apparatus 100 includes the five image forming devices 20 and the five light beam scanners 21 to form a color image including the images of five colors W, Y, M, C, and K superimposed upon each other. The five image forming devices 20 and the five light beam scanners 21 are juxtaposed in the order of W, Y, M, C, and K in a moving direction 5 of the intermediate transfer belt 10.

Each of the light beam scanners 21 is drive-modulated in accordance with the image data to selectively emit a light beam. The emitted light beam is deflected by a polygon mirror, which is driven to rotate by a polygon motor, to scan a surface of the corresponding photoconductor drum 40. The light beam scanner 21 will be described in detail later with FIGS. 5 and 6.

Each of the image forming devices 20 for the respective colors includes the charging device 18, a developing device 29, a transfer device 62, a cleaning device 63, and a discharger 19, which are disposed around the corresponding photoconductor drum 40.

Through charging, exposure, development, and transfer, which form an electrophotographic image forming process, the image forming apparatus 100 sequentially forms the toner image of the first color (W), the toner image of the second color (Y), the toner image of the third color (M), the toner image of the fourth color (C), and the toner image of the fifth color (K) on the intermediate transfer belt 10. Thereby, a color toner image is formed in which the images of the five colors are superimposed upon each other.

Then, the second transfer device 22 transfers the color toner image formed on the intermediate transfer belt 10 onto the recording medium P transferred to the second transfer device 22. Thereby, the color toner image including the superimposed toner images of the five colors is formed on the recording medium P. The color toner image on the recording medium P is then fixed thereon by the fixing device 25 illustrated in FIG. 1.

The image forming apparatus 100 further includes a first sensor 31, a second sensor 32, and a third sensor 33 disposed at respective positions facing one of the rollers 23 via the second transfer belt 24 to detect correction toner images formed on the second transfer belt 24.

The first sensor 31, the second sensor 32, and the third sensor 33 are reflective optical sensors disposed at three locations in the direction of the X axis perpendicular to a moving direction 6 of the second transfer belt 24 (i.e., in a direction perpendicular to the drawing plane). Each of the first sensor 31, the second sensor 32, and the third sensor 33 outputs a voltage signal according to the optical intensity of the reflected light of the emitted light. In the following description, the first sensor 31, the second sensor 32, and the third sensor 33 may be collectively referred to as the first to third sensors 31 to 33.

The optical intensity of the reflected light is different between areas of the surface of the second transfer belt 24 with the correction toner images formed therein and areas of the surface of the second transfer belt 24 without the correction toner images formed therein. The image forming apparatus 100 therefore detects the correction toner images based on the voltage signals output from the first to third sensors 31 to 33 in accordance with the optical intensity of the reflected light.

With the voltage signals input from the first to third sensors 31 to 33, the image forming apparatus 100 detects the misalignment in the main scanning direction, the misalignment in the sub-scanning direction, and the magnification error in the main scanning direction in the correction toner images of the respective colors formed on the second transfer belt 24. Then, based on a result of the detection, the misalignment in the main scanning direction, the misalignment in the sub-scanning direction, and the magnification error in the main scanning direction of the images of the respective colors in relation to images of a particular reference color (e.g., W or K) are corrected on the recording medium P, to which the toner images on the intermediate transfer belt 10 are transferred to form an image.

Figure 3:
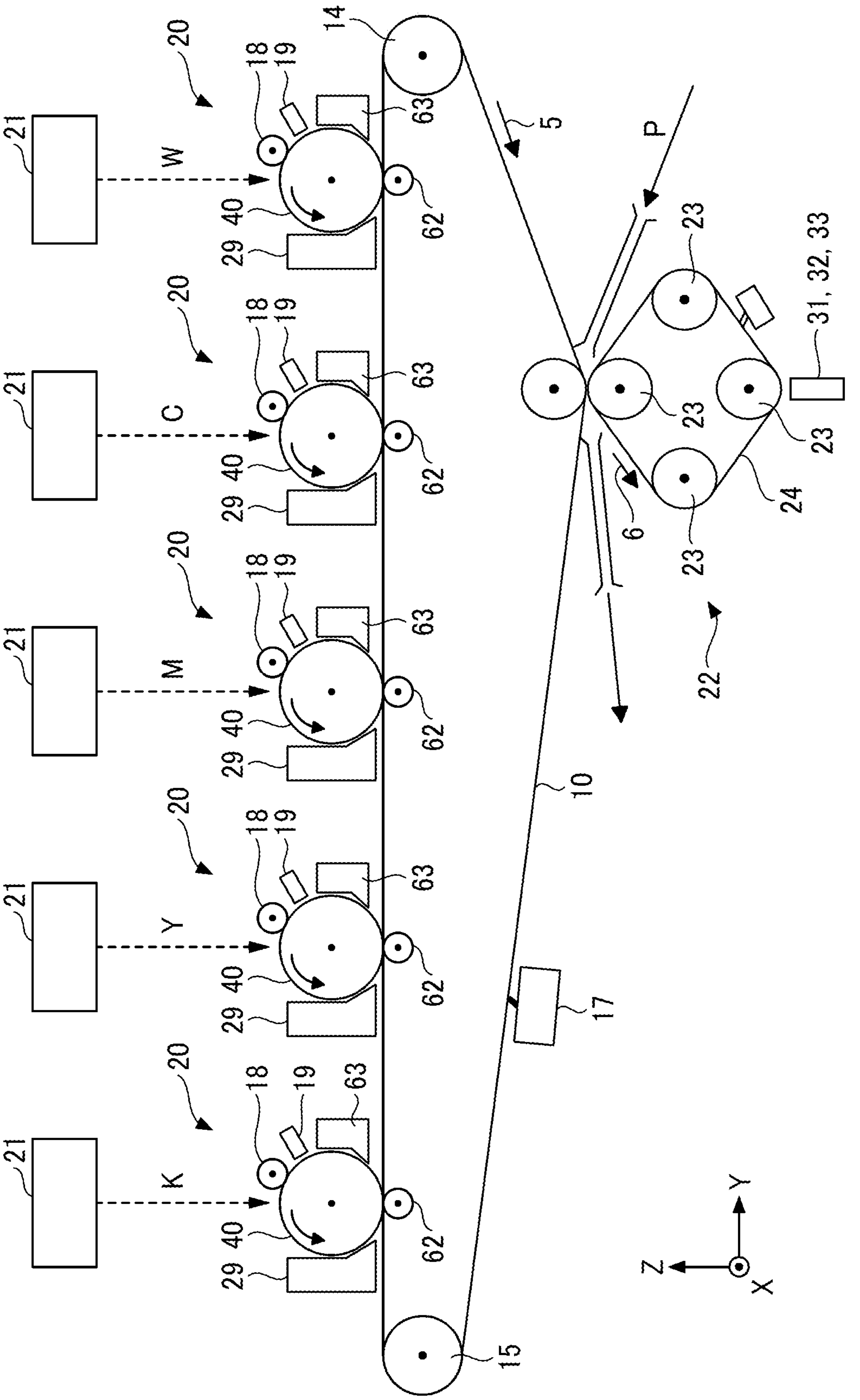
FIG. 3 is a diagram illustrating the image forming devices of the first embodiment arranged differently from those in FIG. 2 in a moving direction of an intermediate transfer belt of the image forming apparatus.

In the image forming apparatus 100, the arrangement of the image forming devices 20 for the respective colors is changeable; the order of the colors for forming the image is changeable in the moving direction 5 of the intermediate transfer belt 10. FIG. 3 illustrates a configuration example of the image forming devices 20, in which the colors K and W are switched. In this case, a W toner image forms the uppermost layer of the toner images formed on the intermediate transfer belt 10. When the toner images are second-transferred onto the recording medium P, therefore, the W toner image forms the lowermost layer of the toner images second-transferred to the recording medium P, serving as a base image.

Figure 4:
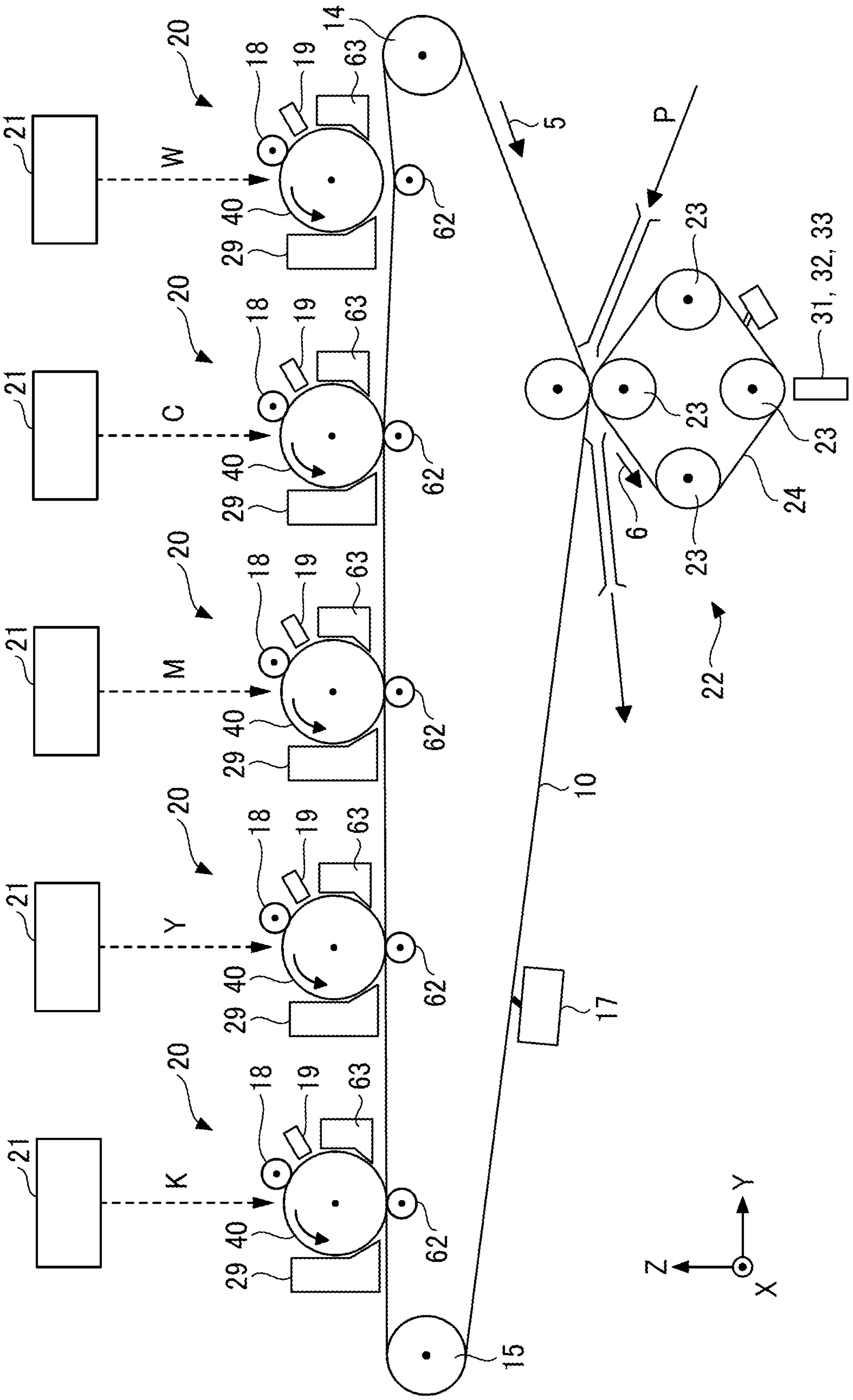
FIG. 4 is a diagram illustrating the image forming devices of the first embodiment, in which one of the image forming devices not used in image formation is separated from the intermediate transfer belt.

As illustrated in FIG. 4, when forming a color image with four colors Y, M, C, and K with the positions of the colors K and W switched, the intermediate transfer belt 10 and the transfer device 62 at a W image forming position may be separated from the corresponding image forming device 20. With the intermediate transfer belt 10 and the transfer device 62 thus separated from the image forming device 20, the image formation is performed without the color W.

The image formation with the four colors may be performed without the separation of the image forming device 20 for the color not used in the image formation. If the image forming device 20 for the color not used in the image formation is operated without being separated from the intermediate transfer belt 10, however, the toner of the color may be degraded or unnecessarily consumed. It is therefore desirable not to operate the image forming device 20 for the color not used in the image formation by separating the image forming device 20 from the intermediate transfer belt 10. The means for separating the image forming device 20 from the intermediate transfer belt 10 is not limited to particular means. For example, an actuator may be used to move one of the targets to separate, i.e., the image forming device 20 and the intermediate transfer belt 10, away from the other of the targets. The operation of the actuator may be controlled by a printer controller.

A configuration example of a scanning optical system 210 included in each of the light beam scanners 21 of the image forming apparatus 100 will be described with FIG. 5.

Figure 5:
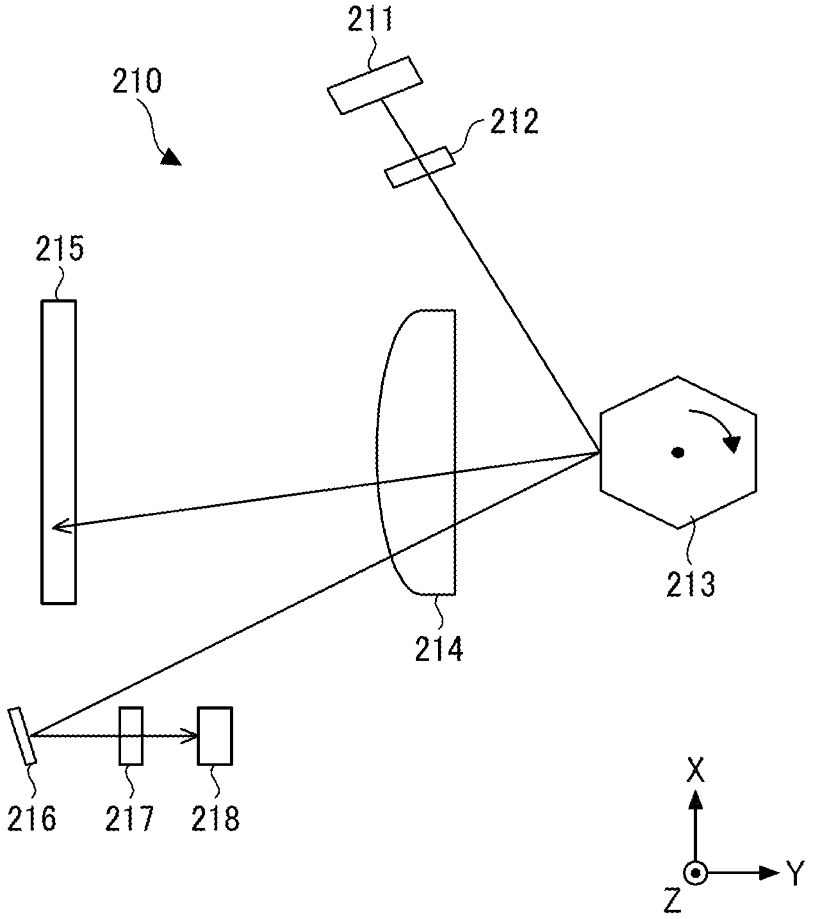
FIG. 5 is a diagram illustrating a configuration example of a scanning optical system included in the image forming apparatus of the first embodiment.

FIG. 5 is a diagram illustrating a configuration example of the scanning optical system 210. FIG. 5 illustrates the scanning optical system 210 in one of the light beam scanners 21 in FIG. 2, as viewed from above (i.e., from the positive side of the Z axis). FIG. 5 illustrates the scanning optical system 210 for one of the five colors. The scanning optical systems 210 for the other four colors are similar in configuration to the scanning optical system 210 illustrated in FIG. 5, and thus redundant description will be omitted here.

A light beam emitted from a laser diode (LD) 211 is shaped by a cylinder lens 212 and incident on a polygon mirror 213. With the rotation of the polygon mirror 213, the incident light beam is deflected and passed through an fθ lens 214. Then, the light beam is reflected by a reflecting mirror 215 to be directed to the photoconductor drum 40. With the deflection angle changing with the rotation of the polygon mirror 213, the surface of the photoconductor drum 40 is scanned with the light beam in the main scanning direction (i.e., in the direction of the X axis).

On a writing start side of the main scanning direction (i.e., on the negative side of the X axis), a synchronization mirror 216, a synchronization lens 217, and a synchronization sensor 218 are disposed. Herein, the term "writing" is synonymous with the term "exposure." On the writing start side, the light beam passed through the fθ lens 214 is reflected by the synchronization mirror 216, and is condensed on a light receiving surface of the synchronization sensor 218 by the synchronization lens 217. The synchronization sensor 218, which is implemented by a photodiode, for example, outputs an electrical signal according to the intensity of the received light beam.

In this case, the light beam reaches the light receiving surface of the synchronization sensor 218 in a particular cycle according to the rotation of the polygon mirror 213. Therefore, the electrical signal output by the synchronization sensor 218 is usable as a synchronization detection signal for synchronizing the start of writing. Based on the synchronization detection signal from the synchronization sensor 218, therefore, the light beam scanner 21 determines the time of starting writing in the main scanning direction.

A hardware configuration of the light beam scanner 21 will be described.

Figure 6:
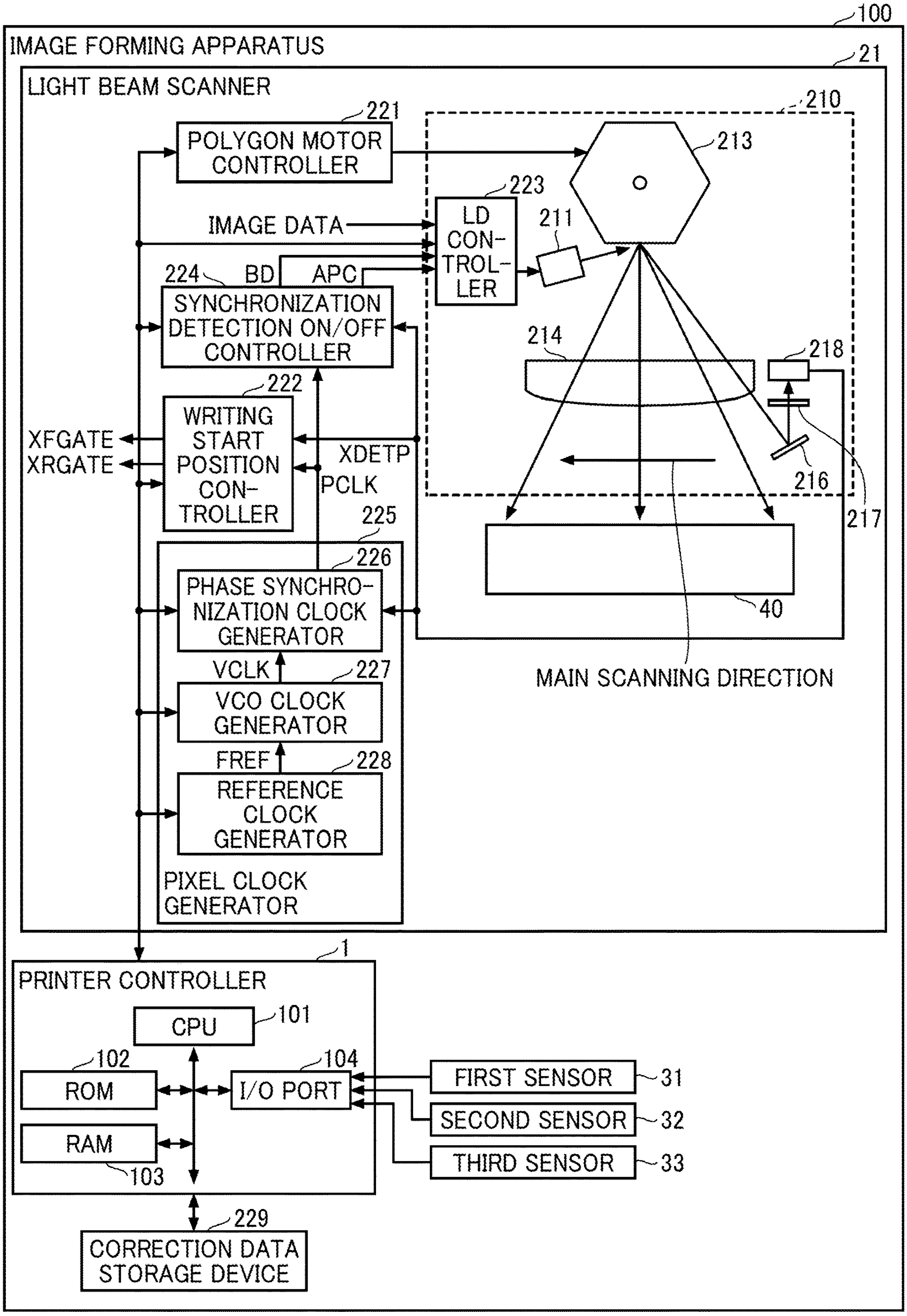
FIG. 6 is a block diagram illustrating a hardware configuration example of a light beam scanner included in the image forming apparatus of the first embodiment.

FIG. 6 is a block diagram illustrating an example of the hardware configuration of the light beam scanner 21. FIG. 6 illustrates the light beam scanner 21 for one of the five colors. The light beam scanners 21 for the other four colors are similar in configuration to the light beam scanner 21 illustrated in FIG. 6, and thus redundant description will be omitted here.

As illustrated in FIG. 6, the light beam scanner 21 includes a polygon motor controller 221, a writing start position controller 222, an LD controller 223, a synchronization detection on/off controller 224, and a pixel clock generator 225.

These devices are implemented by an electronic circuit such as an application specific integrated circuit (ASIC) or a field programmable gate array (FPGA), but are not limited thereto and may be implemented by a central processing unit (CPU), for example.

The light beam scanner 21 is electrically connected to a printer controller 1 to transmit and receive data and signals to and from the printer controller 1, and operates under the control of the printer controller 1. The printer controller 1 is implemented by a CPU 101, a read only memory (ROM) 102, a random access memory (RAM) 103, and an input/output (I/O) port 104, for example. These hardware components are connected to each other via buses.

The CPU 101 is a device that executes a program for controlling the operation of the image forming apparatus 100 to perform a particular process. The ROM 102 is a nonvolatile storage device for storing programs executed by the CPU 101 and firmware. The RAM 103 is a volatile storage device for providing a space for the CPU 101 to execute a program. The RAM 103 is used to store or deploy programs and data. The I/O port 104 is a device that processes information output to devices controlled by the CPU 101 and information input from various sensors, for example.

The I/O port 104 is connected to the first to third sensors 31 to 33. The CPU 101 is connected to the polygon motor controller 221, the writing start position controller 222, the LD controller 223, the synchronization detection on/off controller 224, the pixel clock generator 225, and a correction data storage device 229 via buses. Processes such as the setting of various data including correction data, ON/OFF control, and data storage and reading are performed in accordance with instructions from the CPU 101.

A description will be given of operations of the devices included in the light beam scanner 21.

When the light beam used in the scanning by the scanning optical system 210 passes above the synchronization sensor 218, the synchronization sensor 218 outputs a synchronization detection signal XDETP to the pixel clock generator 225, the synchronization detection on/off controller 224, and the writing start position controller 222.

The pixel clock generator 225 generates a pixel clock signal PCLK, which is synchronized with the synchronization detection signal XDETP. The pixel clock generator 225 outputs the pixel clock signal PCLK to the writing start position controller 222 and the synchronization detection on/off controller 224.

To detect the synchronization detection signal XDETP, the synchronization detection on/off controller 224 first turns on an LD force-on/off signal BD to force on the LD 211. After detecting the synchronization detection signal XDETP, the synchronization detection on/off controller 224 turns on the LD 211 with the synchronization detection signal XDETP and the pixel clock signal PCLK with timing that enables reliable detection of the synchronization detection signal XDETP without causing flare. After detecting the synchronization detection signal XDETP, the synchronization detection on/off controller 224 generates the LD force-on/off signal BD to turn off the LD 211, and outputs the LD force-on/off signal BD to the LD controller 223.

With the synchronization detection signal XDETP and the pixel clock signal PCLK, the synchronization detection on/off controller 224 further generates a light amount control timing signal APC for each of the LDs 211 for the five colors, and outputs the light amount control timing signal APC to the LD controller 223. The light amount control timing signal APC is output during a non-writing period outside the period of writing (i.e., exposure) on the photoconductor drum 40 with the light beam. Thereby, the light amount of the light beam emitted from the LD 211 is controlled to a particular light amount during the non-writing period.

The LD controller 223 controls the turn-on and turn-off of the LD 211 in accordance with the image data synchronized with the LD force-on/off signal BD, the light amount control timing signal APC, and the pixel clock signal PCLK. Thereby, the light beam is emitted from the LD 211, deflected by the polygon minor 213, and directed to the photoconductor drum 40 through the fθ lens 214 to scan the surface of the photoconductor drum 40.

The polygon motor controller 221 controls the polygon mirror 213 to rotate at a particular rotation rate in accordance with a control signal from the printer controller 1.

The writing start position controller 222 sets a main scanning gate signal XRGATE and a sub-scanning gate signal XFGATE based on signals such as the synchronization detection signal XDETP, the pixel clock signal PCLK, and a control signal from the printer controller 1. The main scanning gate signal XRGATE and the sub-scanning gate signal XFGATE determine a writing start time and a writing width (i.e., the width of the toner image).

The pixel clock generator 225 includes a phase synchronization clock generator 226, a voltage controller oscillator (VCO) clock generator 227, and a reference clock generator 228. The pixel clock generator 225 generates the pixel clock signal PCLK as a reference for the time of starting writing.

The phase synchronization clock generator 226 receives input of a VCO clock signal VCLK from the VCO clock generator 227 and the synchronization detection signal XDETP. The phase synchronization clock generator 226 further outputs the pixel clock signal PCLK, which is synchronized with the synchronization detection signal XDETP, to the synchronization detection on/off controller 224, for example.

The reference clock generator 228 generates a reference clock signal FREF. The VCO clock generator 227 generates the VCO clock signal VCLK.

The first to third sensors 31 to 33 output the voltage signals to the printer controller 1. Each of the voltage signals indicates the detection of a correction toner image. Based on the voltage signals, the printer controller 1 acquires misalignment amounts and magnification errors in the main scanning direction of the correction toner images of the respective colors, and acquires correction data for correcting the misalignment amounts and magnification errors in the main scanning direction. The printer controller 1 outputs the acquired correction data to the writing start position controller 222, the pixel clock generator 225, and the correction data storage device 229 to set or update the correction data. The writing start position controller 222 controls the writing start position in accordance with the correction data. The pixel clock generator 225 generates the pixel clock signal PCLK in accordance with the correction data.

The correction data storage device 229, which is implemented by a hard disk drive (HDD) of the image forming apparatus 100, stores the correction data. The stored correction data is read in the image formation, and the misalignment is corrected with the correction data.

A configuration example of the VCO clock generator 227 will be described with FIG. 7.

Figure 7:
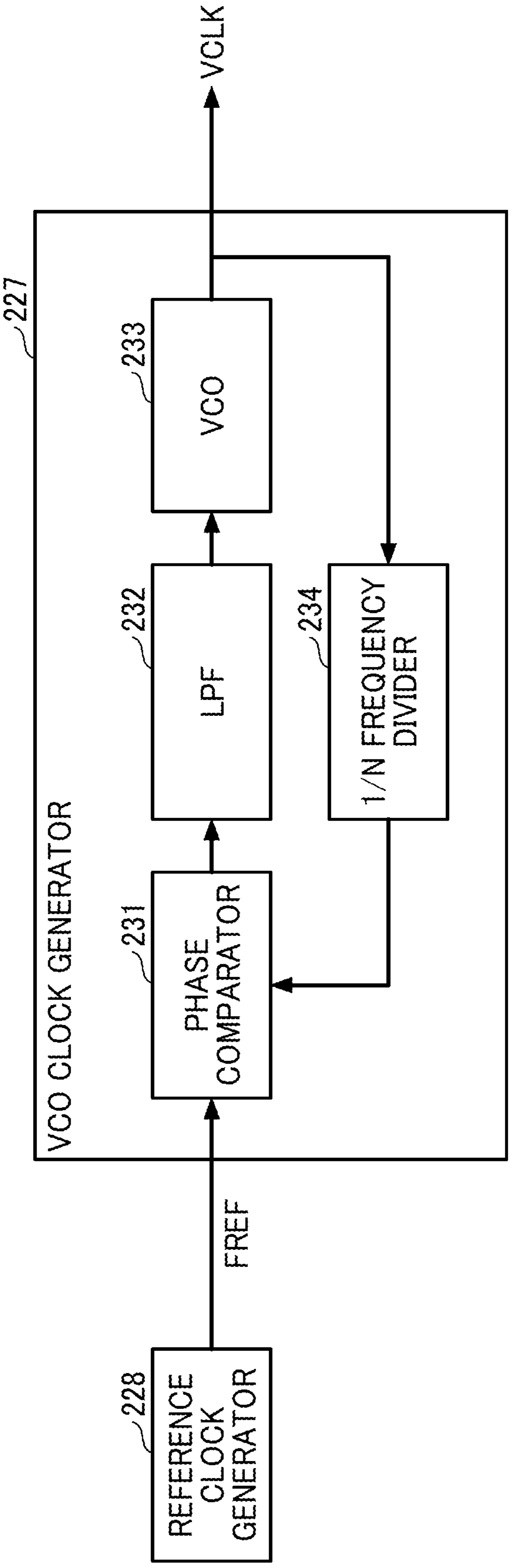
FIG. 7 is a block diagram illustrating a configuration example of a voltage controller oscillator (VCO) clock generator included in the light beam scanner of the first embodiment.

FIG. 7 is a block diagram illustrating a configuration example of the VCO clock generator 227. As illustrated in FIG. 7, the VCO clock generator 227 includes a phase comparator 231, a low pass filter (LPF) 232, a VCO 233, and a 1/N frequency divider 234.

The phase comparator 231 receives input of the reference clock signal FREF from the reference clock generator 228 and a clock signal with the frequency thereof divided into 1/N by the 1/N frequency divider 234. The phase comparator 231 further compares the respective falling edge phases of these two input signals, and outputs an error component with a constant current.

The LPF 232 removes a high-frequency component from the output from the phase comparator 231, and outputs a resultant voltage to the VCO 233.

Based on the output from the LPF 232, the VCO 233 outputs the VCO clock signal VCLK with a particular frequency.

The 1/N frequency divider 234 divides the frequency of the input VCO clock signal VCLK into 1/N with a set frequency division ratio N. The frequency division ratio N and the frequency of the reference clock signal FREF may be changed based on a control signal from the printer controller 1 to change the frequency of the VCO clock signal VCLK. With the frequency of the VCO clock signal VCLK changed, the frequency of the pixel clock signal PCLK is also changed.

A configuration example of the writing start position controller 222 will be described.

Figure 8:
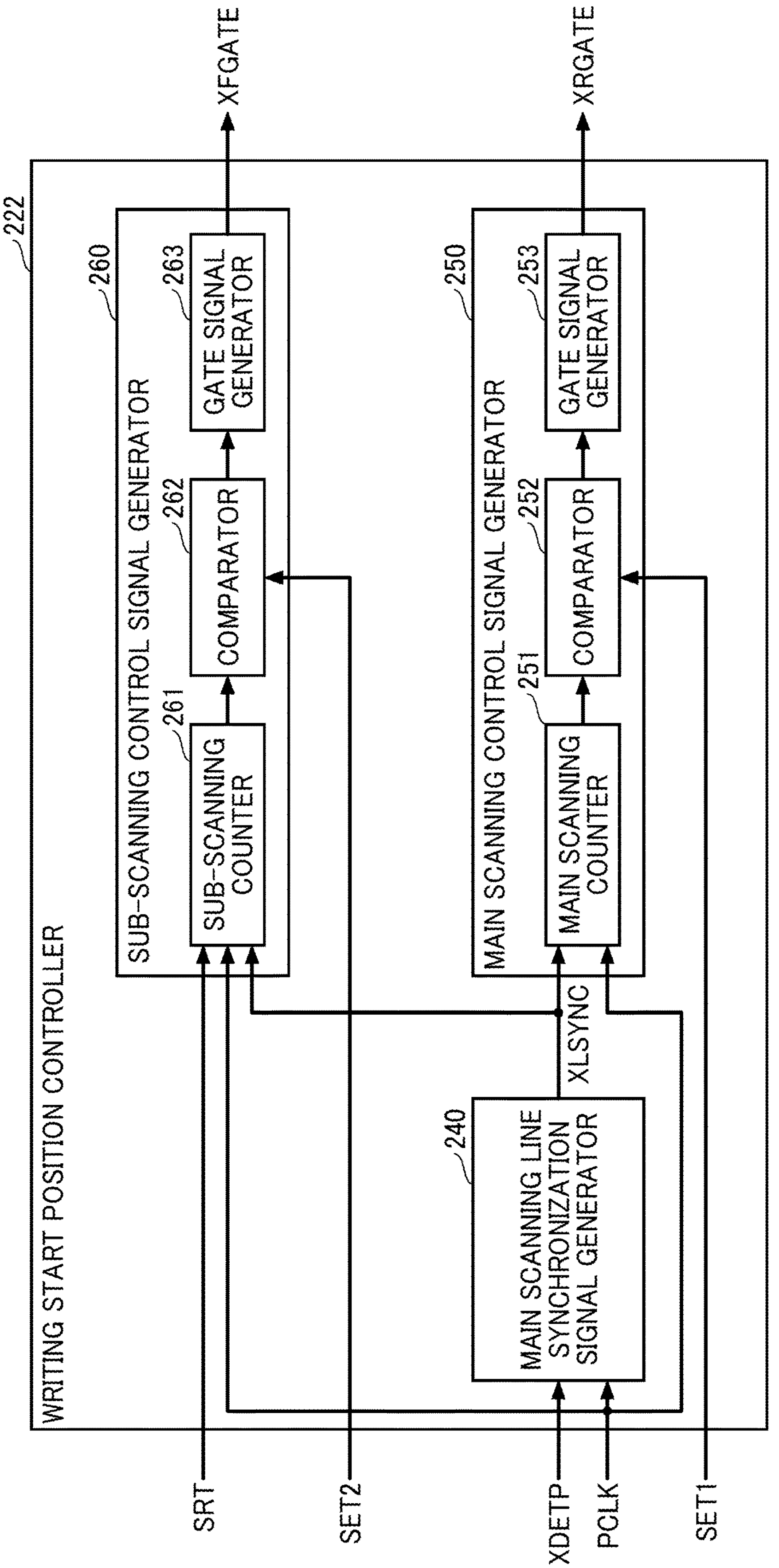
FIG. 8 is a block diagram illustrating a configuration example of a writing start position controller included in the light beam scanner of the first embodiment.

FIG. 8 is a block diagram illustrating a configuration example of the writing start position controller 222 of the image forming apparatus 100. As illustrated in FIG. 8, the writing start position controller 222 includes a main scanning line synchronization signal generator 240, a main scanning control signal generator 250, and a sub-scanning control signal generator 260.

The main scanning line synchronization signal generator 240 generates a counter operation signal XLSYNC for operating a main scanning counter 251 of the main scanning control signal generator 250 and a sub-scanning counter 261 of the sub-scanning control signal generator 260.

The main scanning control signal generator 250 generates the main scanning gate signal XRGATE for determining an image signal capture time (i.e., a writing start time) in the main scanning direction. The sub-scanning control signal generator 260 generates the sub-scanning gate signal XFGATE for determining an image signal capture time (i.e., a writing start time) in the sub-scanning direction.

The main scanning control signal generator 250 includes the main scanning counter 251, a comparator 252, and a gate signal generator 253. The main scanning counter 251 operates with the counter operation signal XLSYNC and the pixel clock signal PCLK. The comparator 252 outputs a result of comparison between a first set value SET1 included in the correction data input from the correction data storage device 229 via the printer controller 1 and a count value of the main scanning counter 251. The gate signal generator 253 generates the main scanning gate signal XRGATE based on the result of comparison output from the comparator 252.

The sub-scanning control signal generator 260 includes the sub-scanning counter 261, a comparator 262, and a gate signal generator 263. The sub-scanning counter 261 operates with a print start signal SRT from the printer controller 1, the counter operation signal XLSYNC, and the pixel clock signal PCLK. The comparator 262 compares a count value of the sub-scanning counter 261 with a second set value SET2 included in the correction data input from the correction data storage device 229 via the printer controller 1, and outputs a result of the comparison. The gate signal generator 263 generates the sub-scanning gate signal XFGATE based on the result of the comparison output from the comparator 262.

The writing start position controller 222 corrects the writing start position in the main scanning direction for each cycle of the pixel clock signal PCLK, i.e., for each dot, and corrects the writing start position in the sub-scanning direction for each cycle of the counter operation signal XLSYNC, i.e., for each line.

A writing start position control operation by the image forming apparatus 100 will be described with FIG. 9. The following description will be given of an example in which each of the synchronization detection signal XDETP, the counter operation signal XLSYNC, the main scanning gate signal XRGATE, and the sub-scanning gate signal XFGATE is a low-active signal that is enabled at low level.

Figure 9:
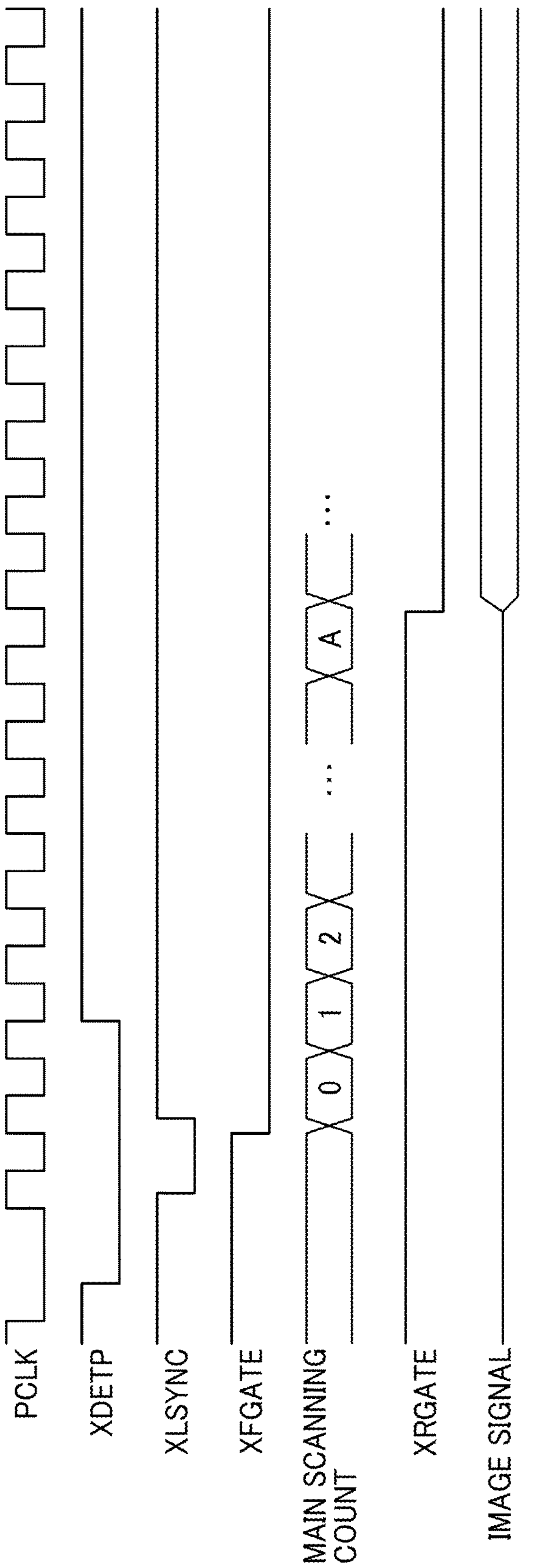
FIG. 9 is a timing chart illustrating writing start control in a main scanning direction according to the first embodiment.

FIG. 9 is a timing chart illustrating an example of writing start position control in the main scanning direction performed by the image forming apparatus 100. With the counter operation signal XLSYNC, a main scanning count is reset. The main scanning count is the count value of the main scanning counter 251 in FIG. 8. With the pixel clock signal PCLK, the main scanning counter 251 counts up. When the count value of the main scanning counter 251 reaches the first set value SET1, the comparator 252 for main scanning outputs a signal representing the comparison result. In the example of FIG. 9, the first set value SET1 is represented as "A."

When the comparator 252 for main scanning outputs the signal indicating that the count value of the main scanning counter 251 has reached the first set value SET1, the main scanning control signal generator 250 sets the main scanning gate signal XRGATE to low level. The main scanning gate signal XRGATE is set to low level during a period corresponding to the width of the toner image in the main scanning direction.

Figure 10:
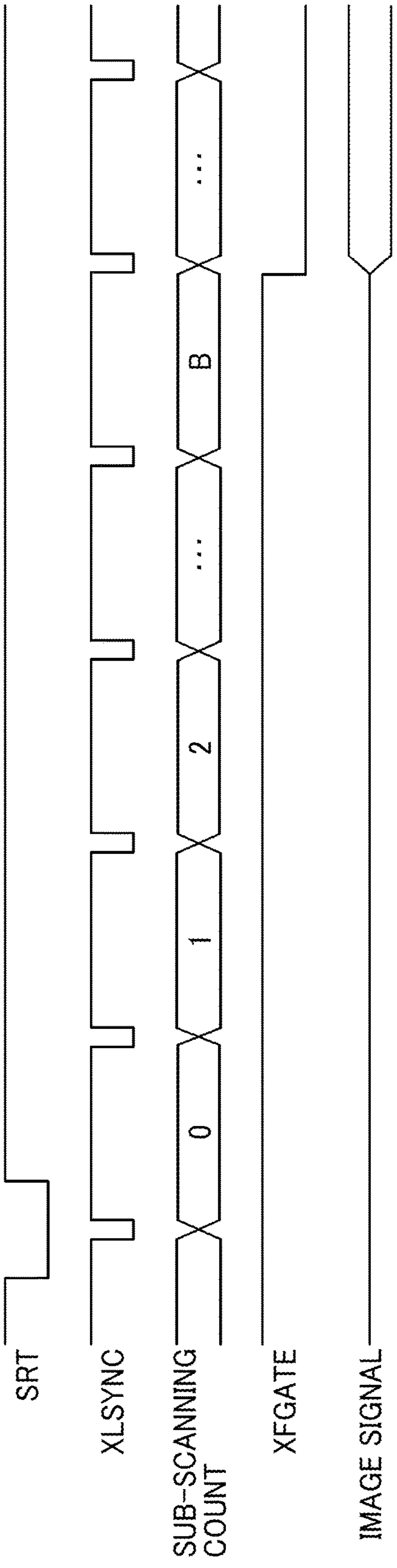
FIG. 10 is a timing chart illustrating writing start control in a sub-scanning direction according to the first embodiment.

FIG. 10 is a timing chart illustrating an example of writing start position control in the sub-scanning direction performed by the image forming apparatus 100. With the print start signal SRT, a sub-scanning count is reset. The sub-scanning count is the count value of the sub-scanning counter 261 in FIG. 8. With the counter operation signal XLSYNC, the sub-scanning counter 261 counts up. When the count value of the sub-scanning counter 261 reaches the second set value SET2, the comparator 262 for sub-scanning outputs a signal representing the comparison result. In the example of FIG. 10, the second set value SET2 is represented as "B."

When the comparator 262 for sub-scanning outputs the signal indicating that the count value of the sub-scanning counter 261 has reached the second set value SET2, the sub-scanning control signal generator 260 sets the sub-scanning gate signal XFGATE to low level. The sub-scanning gate signal XFGATE is set to low level during a period corresponding to the width of the toner image in the sub-scanning direction.

Figure 11:
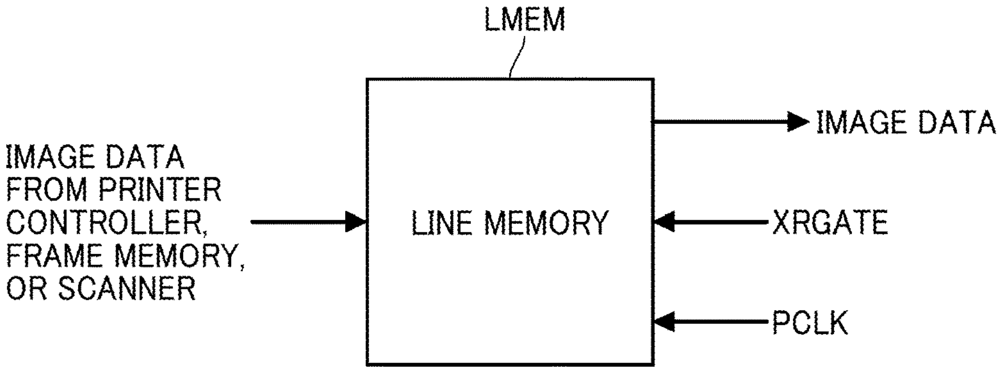
FIG. 11 is a diagram illustrating a configuration example of a line memory included in the image forming apparatus of the first embodiment.

FIG. 11 is a diagram illustrating a configuration example of a line memory LMEM included in the image forming apparatus 100. The line memory LMEM is disposed at a stage preceding the hardware components around the light beam scanner 21 in FIG. 6.

At the time indicated by the sub-scanning gate signal XFGATE, for example, image data captured from the printer controller 1, a frame memory, or a scanner, for instance, is stored in the line memory LMEM. The image data stored in the line memory LMEM is output in synchronization with the pixel clock signal PCLK. Further, the line memory LMEM outputs a signal to the LD controller 223 to control the LD 211 to turn on at the time indicated by the signal.

An example of the image forming operation performed by the image forming apparatus 100 will be described with FIG. 12.

Figure 12:
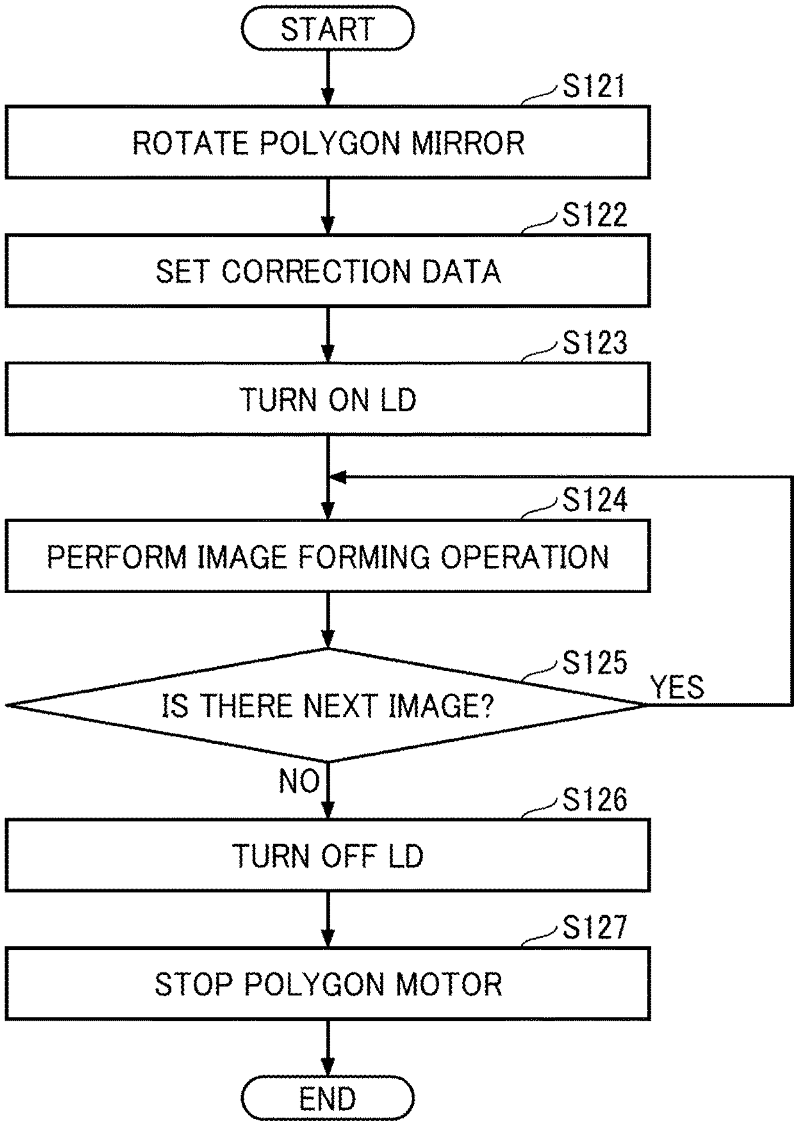
FIG. 12 is a flowchart illustrating an example of an image forming operation according to the first embodiment.

FIG. 12 is a flowchart illustrating an example of the image forming operation performed by the image forming apparatus 100.

At step S121, when a start button of an operation panel of the image forming apparatus 100 is pressed, the polygon motor controller 221 rotates the polygon motor in accordance with an instruction from the printer controller 1 to rotate the polygon minor 213 at a particular rotation rate.

At step S122, the printer controller 1 reads from the correction data storage device 229 the correction data for correcting the writing start position in the main scanning direction, the writing start position in the sub-scanning direction, and the magnification in the main scanning direction, for example. The printer controller 1 then outputs the correction data to the polygon motor controller 221, the writing start position controller 222, the LD controller 223, the synchronization detection on/off controller 224, and the pixel clock generator 225 to set therein the correction data.

At step S123, the synchronization detection on/off controller 224 turns on the LD 211 and performs an automatic power control (APC) operation, for example, to turn on the LD 211 with a particular light amount.

At step S124, the polygon motor controller 221, the writing start position controller 222, the LD controller 223, the synchronization detection on/off controller 224, and the pixel clock generator 225 operate in cooperation with each other to perform the image formation.

At step S125, the printer controller 1 determines whether there is a next image to form.

If it is determined at step S125 that there is a next image to form (YES at step S125), the procedure returns to step S124 to execute the image formation again. If it is determined at step S125 that there is no next image to form (NO at step S125), the procedure proceeds to step S126, in which the LD controller 223 turns off the LD 211 in accordance with an instruction from the printer controller 1.

At step S127, the polygon motor controller 221 stops rotating the polygon motor in accordance with an instruction from the printer controller 1, and the image forming operation is completed.

The image forming apparatus 100 thus performs the image formation on the recording medium P.

A functional configuration example of the printer controller 1 of the first embodiment will be described with FIG. 13.

Figure 13:
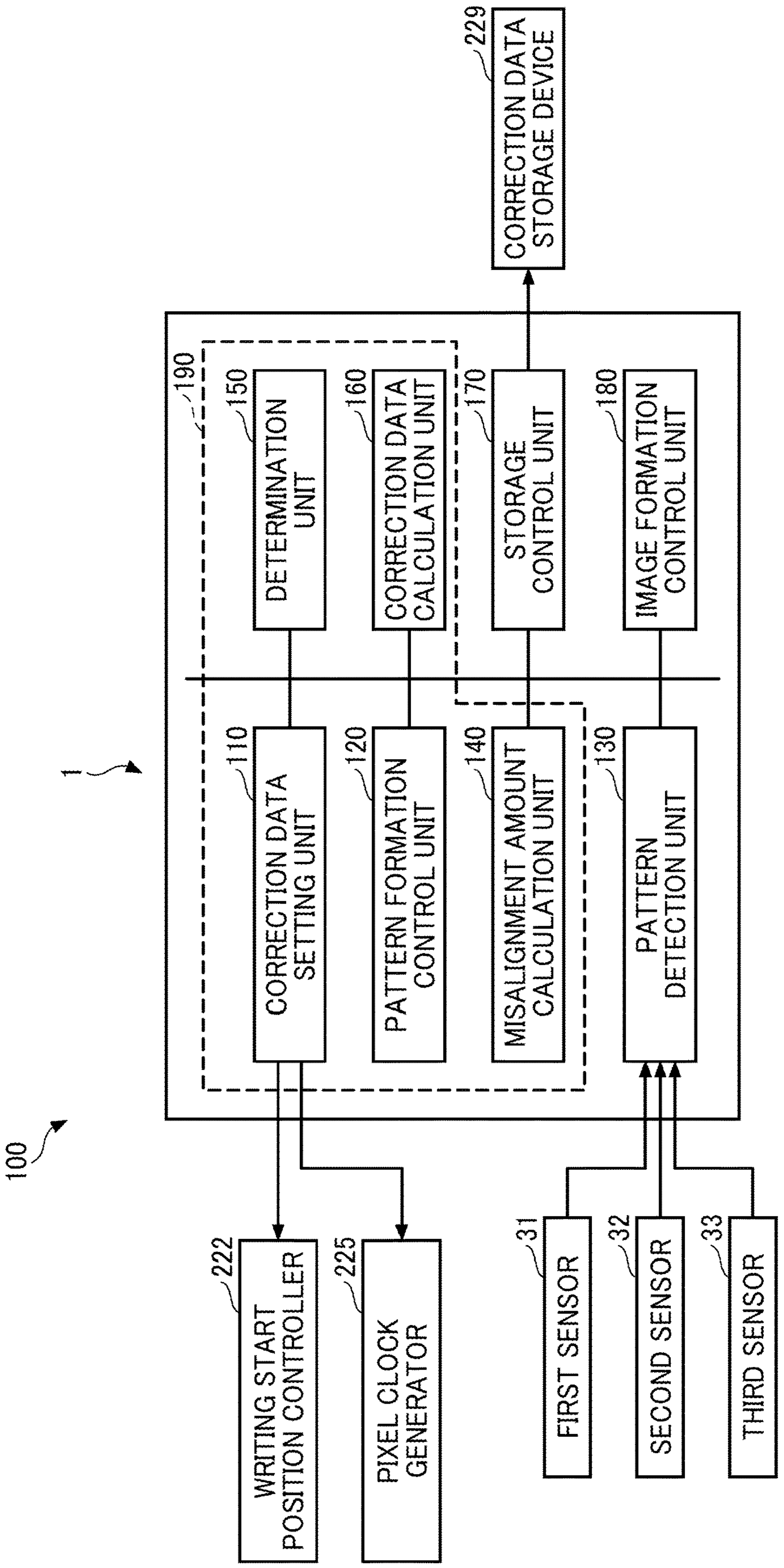
FIG. 13 is a diagram illustrating a functional configuration example of a printer controller included in the image forming apparatus of the first embodiment.

FIG. 13 is a block diagram illustrating a functional configuration example of the printer controller 1. Specifically, FIG. 13 is a functional block diagram illustrating functional units implemented by an image misalignment correction program stored in the ROM 102 and executed by the printer controller 1.

As illustrated in FIG. 13, the printer controller 1 includes the following functional units (means): a correction data setting unit 110, a pattern formation control unit 120, a pattern detection unit 130, a misalignment amount calculation unit 140, a determination unit 150, a correction data calculation unit 160, a storage control unit 170, and an image formation control unit 180.

The correction data setting unit 110 sets the correction data stored in the correction data storage device 229 into the writing start position controller 222 and the pixel clock generator 225.

The pattern formation control unit 120 forms misalignment correction patterns (i.e., correction toner images) for the images of the respective colors.

The pattern detection unit 130 detects the misalignment correction toner images formed on the second transfer belt 24 based on the outputs from the first to third sensors 31 to 33.

The misalignment amount calculation unit 140 calculates a misalignment amount (i.e., color misalignment amount) for each of the colors in relation to a particular reference color based on the correction toner images detected by the pattern detection unit 130.

The determination unit 150 determines whether to perform the misalignment correction based on the misalignment amount calculated for each of the colors in relation to the particular reference color.

The correction data calculation unit 160 calculates the correction data if it is determined to perform the misalignment correction.

The storage control unit 170 updates the correction data stored in the correction data storage device 229 with the calculated correction data.

The image formation control unit 180 performs a printing process based on the calculated correction data.

The pattern detection unit 130 is an example of a detection means (detector). The correction data setting unit 110, the pattern formation control unit 120, the misalignment amount calculation unit 140, the determination unit 150, and the correction data calculation unit 160 may be collectively referred to as the correction unit (means) 190.

The writing start position controller 222 of the light beam scanner 21 controls the writing start position in the main scanning direction and the writing start position in the sub-scanning direction in accordance with the correction data acquired with reference to the correction data storage device 229. Thereby, the positions of the latent images of the respective colors are adjusted in the main scanning direction and the sub-scanning direction. Further, the pixel clock generator 225 generates the pixel clock signal PCLK in accordance with the correction data to correct the magnification error in the main scanning direction.

A first example of the misalignment correction process in the first print mode will be described in detail with FIG. 14.

In the first print mode, in relation to the correction toner images developed in a particular image forming device 20, the misalignment of the correction toner images developed in the other image forming devices 20 is corrected. In the following description, the misalignment correction process for the first print mode may be referred to as the first correction process. Further, the color of the correction toner images developed in the particular image forming device 20 may be referred to as the first reference color, and the correction toner images of the first reference color may be referred to as the first reference images.

Figure 14:
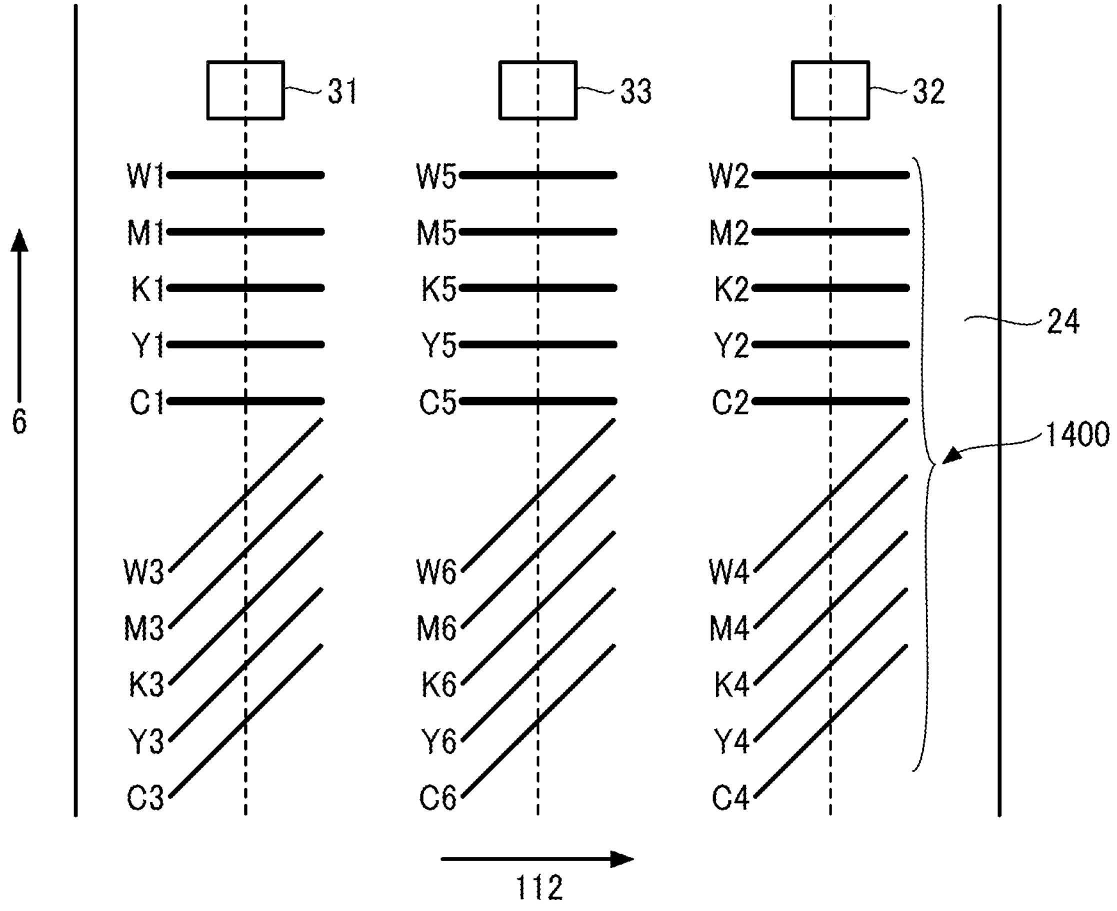
FIG. 14 is a diagram illustrating an example of correction toner images formed in a first correction process of the first embodiment.

FIG. 14 is a diagram illustrating an example of the correction toner images detected by the first to third sensors 31 to 33. FIG. 14 illustrates correction toner images formed on the second transfer belt 24 moving in the moving direction 6. The correction toner images illustrated in FIG. 14 correspond to the configuration of the image forming devices 20 illustrated in FIG. 2.

Herein, reference numerals W1, W2, W3, W4, W5, and W6 represent white correction toner images, and reference numerals M1, M2, M3, M4, W5, and M6 represent magenta correction toner images. Further, reference numerals K1, K2, K3, K4, K5, and K6 represent black correction toner images, and reference numerals Y1, Y2, Y3, Y4, Y5, and Y6 represent yellow correction toner images. Furthermore, reference numerals C1, C2, C3, C4, C5, and C6 represent cyan correction toner images.

The first sensor 31 disposed upstream in a main scanning direction 112 (i.e., on the left side in FIG. 14) detects the correction toner images W1, M1, K1, Y1, C1, W3, M3, K3, Y3, and C3 formed upstream in the main scanning direction 112. The first sensor 31 detects these correction toner images W1 to C1 and W3 to C3, which move with the rotation of the second transfer belt 24. The first sensor 31 then outputs the voltage signal to the correction unit 190. The voltage of the voltage signal changes chronologically.

The second sensor 32 disposed downstream in the main scanning direction 112 (i.e., on the right side in FIG. 14) detects the correction toner images W2, M2, K2, Y2, C2, W4, M4, K4, Y4, and C4 formed downstream in the main scanning direction 112. Similarly to the first sensor 31, the second sensor 32 detects these correction toner images W2 to C2 and W4 to C4, which move with the rotation of the second transfer belt 24. The second sensor 32 then outputs the voltage signal to the correction unit 190. The voltage of the voltage signal changes chronologically.

The third sensor 33 disposed in the middle in the main scanning direction 112 (i.e., in the middle in FIG. 14) detects the correction toner images W5, M5, K5, Y5, C5, W6, M6, K6, Y6, and C6 formed in the middle in the main scanning direction 112. The third sensor 33 similarly detects these correction toner images W5 to C5 and W6 to C6, which move with the rotation of the second transfer belt 24. The third sensor 33 then outputs the voltage signal to the correction unit 190. The voltage of the voltage signal changes chronologically.

The correction toner images W1 to W6, M1 to M6, K1 to K6, Y1 to Y6, and C1 to C6 form a correction toner image set 1400.

The pattern detection unit 130 detects each of the correction toner images on the second transfer belt 24 based on the time when the voltage of the voltage signal input from the corresponding one of the first to third sensors 31 to 33 reaches the voltage value corresponding to the correction toner image.

In the first print mode, the correction is performed with the first reference color set to black (K), the image of which is formed by the image forming device 20 located most downstream in the moving direction 5 of the intermediate transfer belt 10 (see FIG. 2). In relation to the positions of the black correction toner images K1 to K6, therefore, the positions of the correction toner images of the other colors are acquired.

The correction toner images W3, W4, W6, M3, M4, M6, K3, K4, K6, Y3, Y4, Y6, C3, C4, and C6 of the correction toner image set 1400, which are diagonal line images, are used to acquire the misalignment amounts and the magnification errors in the main scanning direction. The correction toner images W1, W2, W5, M1, M2, M5, K1, K2, K5, Y1, Y2, Y5, C1, C2, and C5 of the correction toner image set 1400, which are horizontal line images, are used to acquire the misalignment amounts in the sub-scanning direction.

A more detailed description will be given with the cyan correction toner images C1 to C6 as an example. The misalignment correction in the main scanning direction will first be described.

The correction unit 190 acquires a time difference TKC13 between an elapsed time tk1 and an elapsed time tc1. The elapsed time tk1 is the time elapsed since the detection of the correction toner image K1 until the detection of the correction toner image K3. The elapsed time tc1 is the time elapsed since the detection of the correction toner image C1 until the detection of the correction toner image C3. The correction unit 190 further acquires a time difference TKC24 between an elapsed time tk2 and an elapsed time tc2. The elapsed time tk2 is the time elapsed since the detection of the correction toner image K2 until the detection of the correction toner image K4. The elapsed time tc2 is the time elapsed since the detection of the correction toner image C2 until the detection of the correction toner image C4.

The difference value between the time difference TKC24 and the time difference TKC13 corresponds to the magnification error in the main scanning direction of the cyan correction toner images in relation to the black correction toner images. This magnification error in the main scanning direction is stored in the correction data storage device 229 as the correction data. The pixel clock generator 225 changes the frequency of the pixel clock signal PCLK in accordance with the magnification error in the main scanning direction to correct the magnification error in the main scanning direction.

Further, the value obtained by subtracting the above-calculated correction value, i.e., the value of the magnification error calculated at the position of the first sensor 31, from the time difference TKC13 corresponds to the misalignment amount in the main scanning direction of the cyan correction toner images in relation to the black correction toner images. This misalignment amount in the main scanning direction is stored in the correction data storage device 229 as the correction data. In accordance with the misalignment amount in the main scanning direction, the writing start position controller 222 changes the time of shifting the level of the main scanning gate signal XRGATE for determining the writing start time, to thereby correct the misalignment in the main scanning direction.

The misalignment in the main scanning direction of the cyan correction toner images is thus corrected.

A description will be given of the misalignment correction in the sub-scanning direction.

Herein, an ideal time is represented as Tc, and the time elapsed since the detection of the correction toner image K1 until the detection of the correction toner image C1 is represented as TKC1. Further, time elapsed since the detection of the correction toner image K2 until the detection of the correction toner image C2 is represented as TKC2, and the time elapsed since the detection of the correction toner image K5 until the detection of the correction toner image C5 is represented as TKC5.

With the above-defined times, ((TKC5+TKC2+TKC1)/3)−Tc is calculated to acquire the misalignment amount in the sub-scanning direction of the cyan correction toner images in relation to the black correction toner images. This misalignment amount in the sub-scanning direction is stored in the correction data storage device 229 as the correction data. In accordance with the misalignment amount in the sub-scanning direction, the writing start position controller 222 changes the time of shifting the level of the sub-scanning gate signal XFGATE for determining the writing start time, to thereby correct the misalignment in the sub-scanning direction.

The misalignment in the sub-scanning direction of the cyan correction toner images is thus corrected.

The correction process described above with the example of the cyan correction toner images is also performed with the correction toner images of the other colors Y, M, and W. Thereby, the misalignment in the main scanning direction, the misalignment in the sub-scanning direction, and the magnification error in the main scanning direction are corrected for each of the colors.

The correction toner images illustrated in the present embodiment have the diagonal line pattern or the horizontal line pattern. However, the correction toner images are not limited to these patterns, and any other desired pattern may be used. Further, in the illustrated example, the correction toner images are formed at three locations in the main scanning direction. The location of the correction toner images, however, is not limited thereto.

Figure 15:
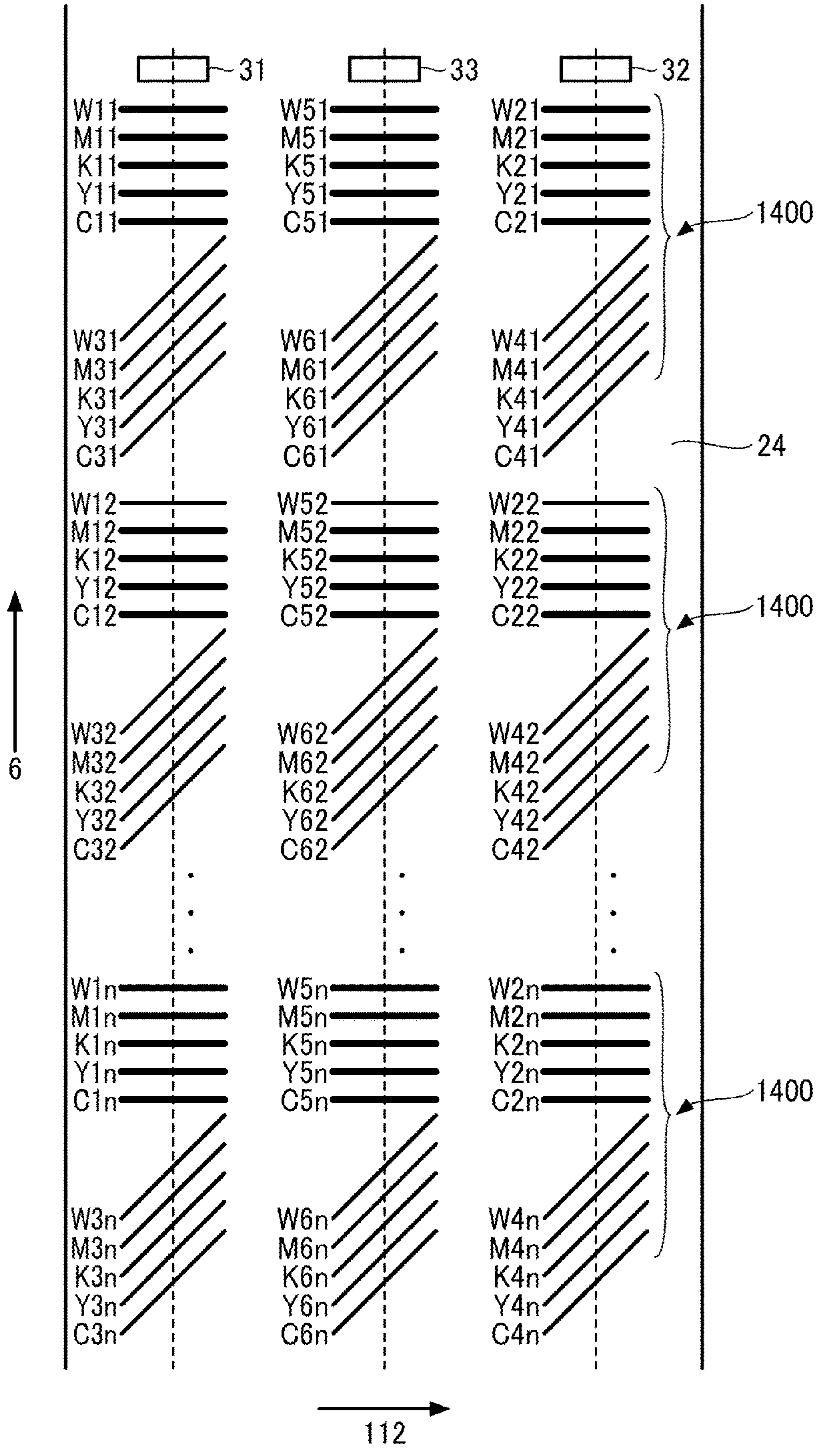
FIG. 15 is a diagram illustrating another example of the correction toner images formed in the first correction process of the first embodiment.

Further, in the above-described example of the present embodiment, the misalignment of the images of the respective colors is corrected with the single correction toner image set 1400. Alternatively, the misalignment of the images of the respective colors may be corrected with a plurality of correction toner image sets 1400 formed along the moving direction 6 of the second transfer belt 24, as illustrated in FIG. 15. In this case, the misalignment amounts in the main scanning direction, the magnification errors in the main scanning direction, and the misalignment amounts in the sub-scanning direction acquired with the plurality of correction toner image sets 1400 are averaged, and the resultant mean values are used as the correction data. In the thus-acquired correction data, detection errors are reduced owing to the averaging effect.

A second example of the misalignment correction process in the first print mode will be described in detail with FIG. 16.

Figure 16:
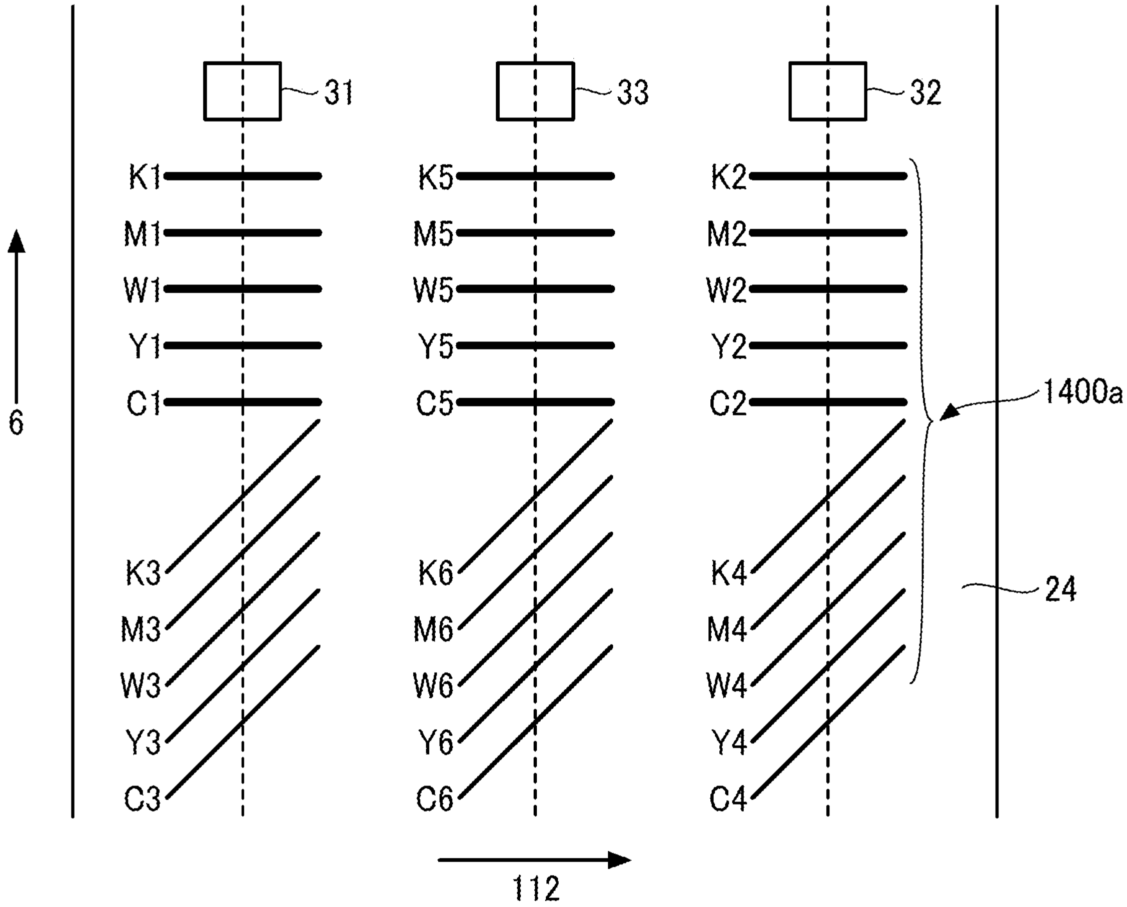
FIG. 16 is a diagram illustrating still another example of the correction toner images formed in the first correction process of the first embodiment.

FIG. 16 is a diagram illustrating an example of the correction toner images corresponding to the configuration of the image forming devices 20 illustrated in FIG. 3. That is, the black correction toner images and the white correction toner images in the correction toner image set 1400 of FIG. 14 are switched in position in a correction toner image set 1400*a* illustrated in FIG. 16.

In the present example, the first reference color is white (W) corresponding to the image forming device 20 disposed most downstream in the moving direction 5 of the intermediate transfer belt 10 (see FIG. 3). The misalignment of the colors other than white is corrected with reference to the color white. The correction process of this example is similar to the first correction process described above with FIG. 14 except for the difference in the first reference color, and thus redundant description will be omitted here.

An example of the misalignment correction process in the second print mode will be described with FIG. 17.

In the second print mode, the first reference color used in the first correction process is not used in the image formation. Therefore, the color of the correction toner images developed in an image forming device 20 different from the image forming device 20 that develops the correction toner images of the first reference color in the first correction process is set as a new reference color. Then, in relation to the correction toner images formed in the new reference color, the correction unit 190 corrects the misalignment of the correction toner images formed in the colors other than the new reference color. In the following description, the misalignment correction process for the second print mode may be referred to as the second correction process. Further, the reference color in the second correction process may be referred to as the second reference color, and the correction toner images of the second reference color may be referred to as the second reference images.

Figure 17:
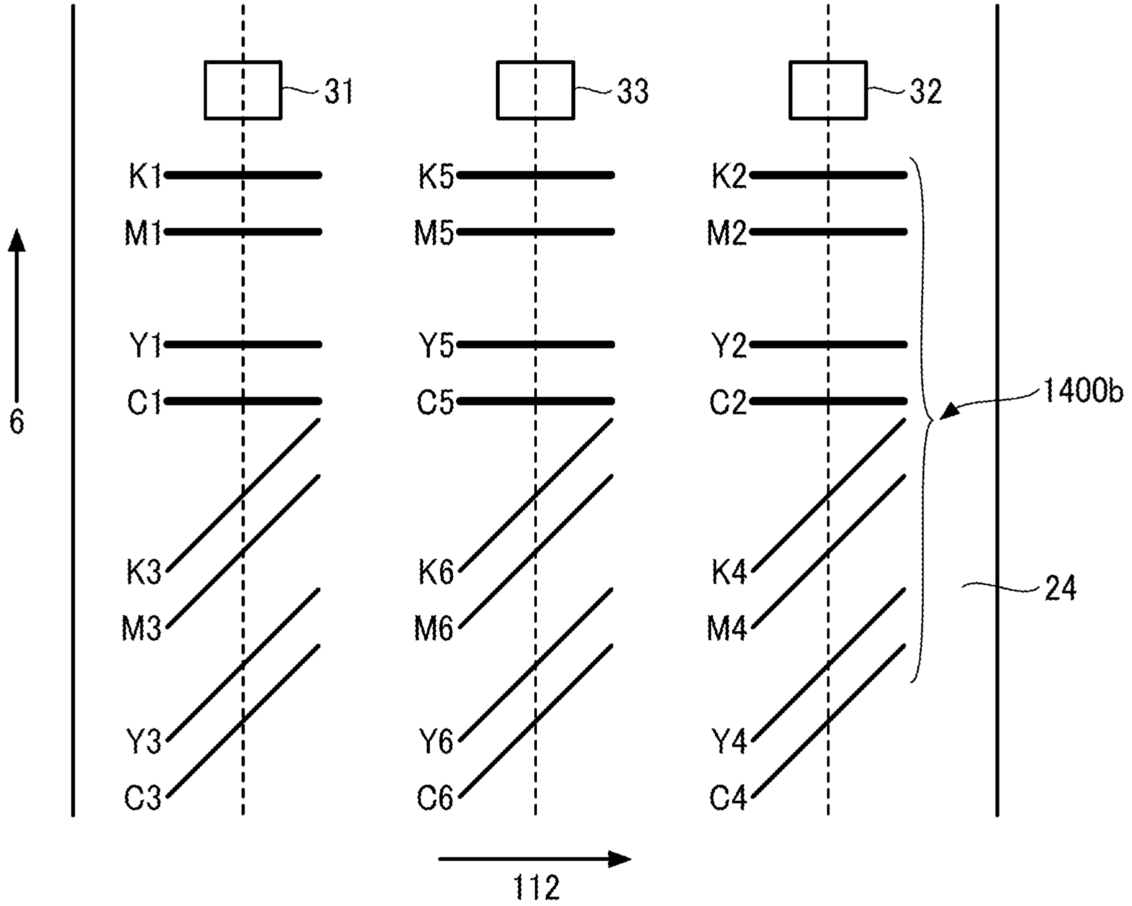
FIG. 17 is a diagram illustrating an example of the correction toner images formed in a second correction process of the first embodiment.

The configuration of the image forming devices 20 for forming the correction toner images illustrated in FIG. 17 is similar to that illustrated in FIG. 4. That is, the correction toner images K1 to K6, M1 to M6, Y1 to Y6, and C1 to C6 form a correction toner image set 1400*b*.

In relation to the correction toner images of the color black (K), which is newly set as the second reference color, the correction unit 190 calculates the misalignment amounts of the correction toner images of the other colors. The second correction process is similar to the first correction process described above with FIG. 14 except for the change in the ideal time Tc in the sub-scanning direction due to the change in the position of the reference color, and thus redundant description will be omitted here.

An example of a misalignment correction operation performed by the image forming apparatus 100 will be described with FIG. 18.

Figure 18:
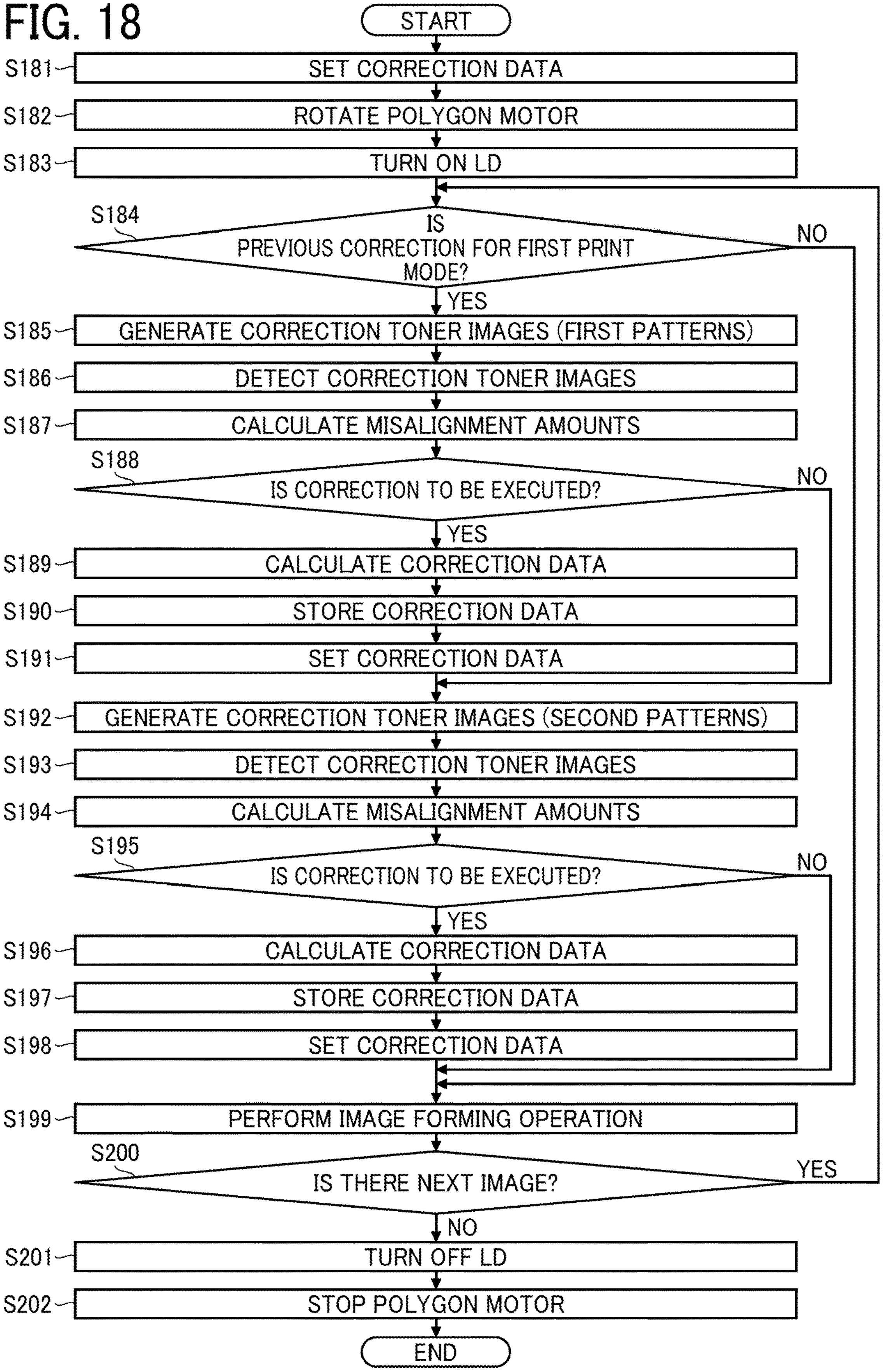
FIG. 18 is a flowchart illustrating an example of a misalignment correction operation according to the first embodiment.

FIG. 18 is a flowchart illustrating an example of the misalignment correction operation performed by the image forming apparatus 100.

The execution of the misalignment correction on the images of the respective colors is controlled by the printer controller 1. The printer controller 1 executes the misalignment correction at a particular time, such as when the print mode switches, when the number of prints reaches a specified print count, or when a monitored temperature changes by more than a specified value, for example.

A description will be given of the misalignment correction executed in the image forming apparatus 100 including the image forming devices 20 configured as illustrated in FIG. 3.

At step S181, the correction unit 190 of the printer controller 1 first sets the stored correction data in the writing start position controller 222 and the pixel clock generator 225. The correction data is set in a previous correction operation and stored in the correction data storage device 229.

At step S182, the polygon motor controller 221 rotates the polygon motor based on a control signal from the printer controller 1. With the rotation of the polygon motor, the polygon mirror 213 rotates.

At step S183, the synchronization detection on/off controller 224 turns on the LD 211 based on a control signal from the printer controller 1.

At step S184, the correction unit 190 checks if the previous correction operation is for the first print mode. If the previous correction operation is for the first print mode (YES at step S184), the correction unit 190 executes subsequent steps to determine whether to execute the first correction process.

If the previous correction operation is not for the first print mode (NO at step S184), the correction unit 190 may determine not to execute the correction operation, as illustrated in FIG. 18. Alternatively, if it is determined that the previous correction operation is not for the first print mode, the correction unit 190 may further determine whether other conditions related to the print count and the change in temperature, for example, are met. Then, if it is determined that these conditions are met, the correction unit 190 may execute the subsequent steps to determine whether to execute the first correction process.

At step S185, after having determined that the previous correction operation is for the first print mode, the correction unit 190 controls devices such as the image forming devices 20 and the light beam scanners 21 to form the correction toner images.

At step S186, the pattern detection unit 130 of the printer controller 1 acquires detection information output from the first to third sensors 31 to 33. The detection information indicates that the correction toner images on the second transfer belt 24 have been detected.

At step S187, based on the detection information of the correction toner images acquired by the pattern detection unit 130, the correction unit 190 calculates the misalignment amounts (i.e., the misalignment amount in the main scanning direction, the misalignment amount in the sub-scanning direction, and the magnification error in the main scanning direction) of the correction toner images of the respective colors in relation to the first reference images.

At step S188, based on the calculated misalignment amounts of the correction toner images of the respective colors, the correction unit 190 determines whether to execute the first correction process. Specifically, if any of the calculated misalignment amounts exceeds a particular value (YES at step S188), the correction unit 190 executes subsequent steps related to the first correction process. More specifically, if the misalignment amount is determined to be equal to or more than a half of correction resolution, the correction unit 190 executes the subsequent steps related to the first correction process.

At step S189, the correction unit 190 generates the correction data. At step S190, the correction unit 190 stores the correction data in the correction data storage device 229. At step S191, the correction unit 190 sets the correction data in the writing start position controller 222 and the pixel clock generator 225. Thereby, the first correction process is executed.

If it is determined at step S188 not to execute the first correction process (NO at step S188), the correction unit 190 does not execute the processes of steps S189 to S191.

The correction unit 190 then executes the second correction process. Specifically, the image forming device 20 having developed the correction toner images of the first reference color is separated from the intermediate transfer belt 10 before the execution of the second correction process. In this case, the color black (K) of the correction toner images formed by the image forming device 20 located most upstream in the moving direction 5 of the intermediate transfer belt 10 is set as the second reference color. In relation to the K correction tonner images formed on the second transfer belt 24, the correction unit 190 executes the second correction process based on the misalignment amounts of the correction toner images of the other colors. Specific processes of steps S192 to S198 of the second correction process in the present embodiment are similar to those of steps S185 to S191 of the first correction process except for the difference in the reference color, and thus description thereof will be omitted here.

The image formation controller 180 of the printer controller 1 then controls devices such as the image forming devices 20 and the light beam scanners 21 to execute the image forming process on the recording medium P. Steps S199 to S202 of the image forming process are similar to steps S124 to S127 described above with FIG. 12, and thus description thereof will be omitted here.

As described above, according to the first embodiment, the image forming apparatus 100 sequentially executes the first correction process and the second correction process. In the first correction process, based on the images developed on the first group of image bearers of the plurality of image bearers, the misalignment correction is performed in relation to the images developed on the first image bearer. The first group of image bearers includes the first image bearer and the second image bearer different from the first image bearer. The first image bearer is, for example, the photoconductor drum 40 included in the image forming device 20 that develops the correction toner images of the first reference color. In the second correction process, based on the images developed on the second group of image bearers, the misalignment correction is performed in relation to the images developed on the second image bearer. The second group of image bearers excludes the first image bearer and includes the second image bearer. The second image bearer is, for example, the photoconductor drum 40 included in the image forming device 20 that develops the correction toner images of the second reference color.

In the first correction process, therefore, the misalignment correction is first performed on the correction toner images of the respective colors with reference to the correction toner images serving as the first reference images. Then, in the second correction process, the misalignment correction is performed on the correction toner images of the respective colors, excluding the correction toner images as the first reference images, with reference to the correction toner images as the second reference images. That is, in the second correction process, the positions of the correction toner images as the first reference images are indirectly referred to through the correction toner images as the second reference images. With the correction data calculated with the second correction process, therefore, the image forming apparatus 100 performs the image formation without causing misalignment in the images formed before the correction, even if the image forming apparatus 100 is switched to the second print mode, for example.

A description will be given of the image forming apparatus 100 according to a second embodiment of the present invention.

Similarly as in the first embodiment, the image forming apparatus 100 of the second embodiment includes the printer controller 1, which includes the correction unit 190, as illustrated in FIG. 13.

An example of the misalignment correction process in the first print mode (i.e., the first correction process) performed in the image forming apparatus 100 of the second embodiment will be described in detail with FIG. 16, which illustrates an example of the correction toner images formed on the second transfer belt 24. As described above, the correction toner images illustrated in FIG. 16 correspond to the configuration of the image forming devices 20 illustrated in FIG. 3.

As illustrated in FIG. 16, the correction toner images K1 to K6, M1 to M6, W1 to W6, Y1 to Y6, and C1 to C6 form the correction toner image set 1400*a*. The first reference color of the correction toner images is white, which corresponds to the image forming device 20 disposed most downstream in the moving direction 5 of the intermediate transfer belt 10. The misalignment of the colors other than white is corrected with reference to white. The first correction process of the second embodiment is similar to that of the first embodiment, and thus redundant description will be omitted here.

An example of the misalignment correction process in the second print mode (i.e., the second correction process) performed in the image forming apparatus 100 of the second embodiment will be described with FIG. 19.

In the second embodiment, the first reference color in the first correction process is not used in the image formation in the second print mode similarly as in the first embodiment.

In this example, the time of generating the correction patterns is changed such that the white correction toner images W1 to W6 and the black correction toner images K1 to K6 are switched in position. Further, the image forming device 20 for the color white is separated from the intermediate transfer belt 10; the correction toner images W1 to W6 are not formed on the intermediate transfer belt 10 and the second transfer belt 24. In this state, the correction unit 190 of the printer controller 1 executes the second correction process.

Figure 19:
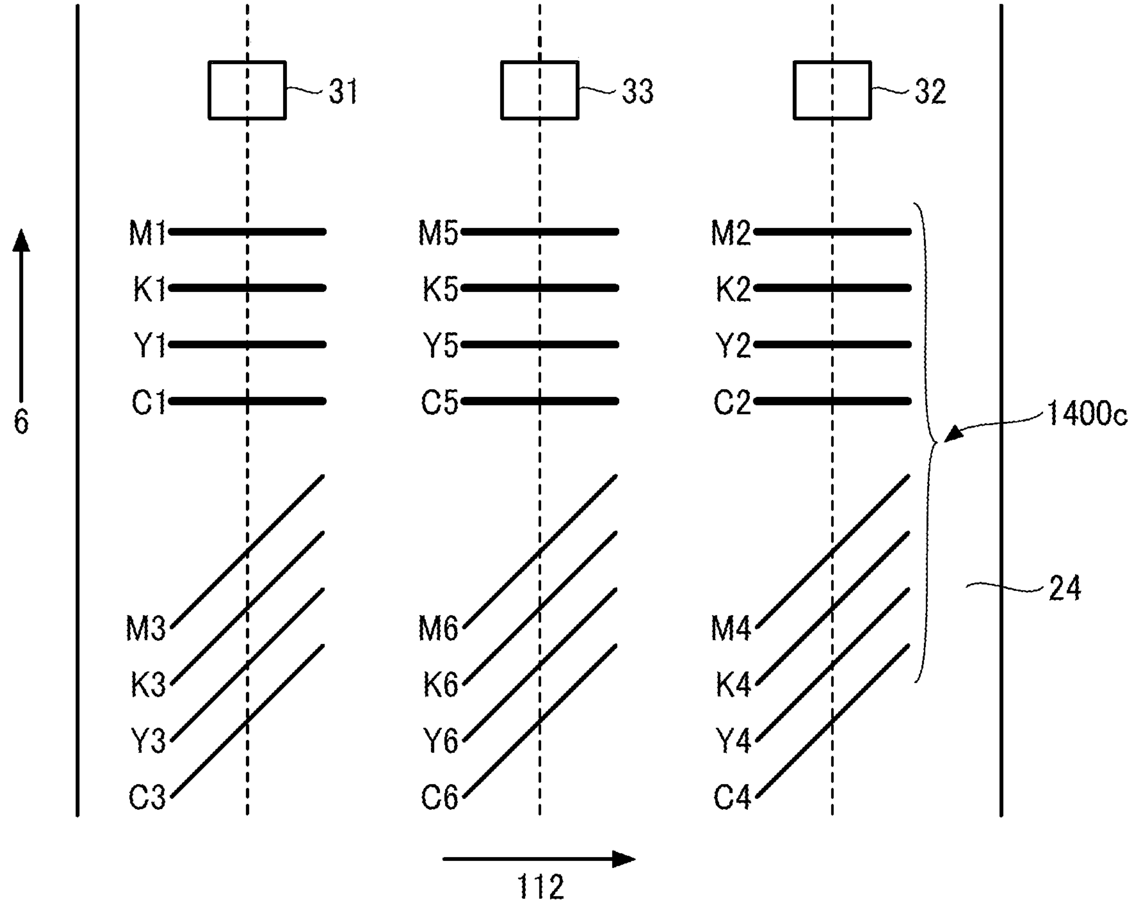
FIG. 19 is a diagram illustrating an example of the correction toner images formed in a second correction process according to a second embodiment of the present invention.

As illustrated in FIG. 19, the correction toner images M1 to M6, K1 to K6, Y1 to Y6, and C1 to C6 form a correction toner image set 1400*c*. In this case, the second reference color of the correction toner images is black, which corresponds to the image forming device 20 disposed most upstream in the moving direction 5 of the intermediate transfer belt 10. The second correction process of the second embodiment is similar to that of the first embodiment, and thus redundance description will be omitted here.

According to the image forming apparatus 100 of the second embodiment, in the set of correction toner images of the respective colors, the positions of the correction toner images as the first reference images formed through the execution of the first correction process correspond to the positions of the correction toner images as the second reference images formed through the execution of the second correction process. Consequently, there is no change in the ideal time Tc in the sub-scanning direction. Further, there is no change in the arrangement order of the correction toner images of the respective colors passing through the first to third sensors 31 to 33 other than the first reference images and the second reference images. Thereby, the misalignment correction process is simplified.

In the above-described embodiments, the misalignment is corrected with the correction toner images formed on the second transfer belt 24. Alternatively, the misalignment may be corrected with correction toner images formed on the intermediate transfer belt 10, for example. In the case of an image forming apparatus using a direct transfer method of directly transferring the toner images onto the recording medium P from the photoconductor drums 40 without via the intermediate transfer belt 10, for example, the misalignment may be corrected with correction toner images formed on a transfer member from which the toner images are transferred to the recording medium P.

Further, according to an embodiment of the present invention, an image misalignment correction method includes, for example, detecting a plurality of images on a transfer member of an image forming apparatus and correcting misalignment of the plurality of images based on a result of the detecting. The correcting includes first correcting and second correcting, which are sequentially executed. The first correcting includes correcting the misalignment in relation to a plurality of images developed on a first image bearer based on a plurality of images developed on a first group of image bearers of a plurality of image bearers. The first group of image bearers includes the first image bearer and a second image bearer different from the first image bearer. The second correcting includes correcting the misalignment in relation to a plurality of images developed on the second image bearer based on a plurality of images developed on a second group of image bearers of the plurality of image bearers. The second group of image bearers excludes the first image bearer and includes the second image bearer. The image misalignment correction method provides similar effects to those of the foregoing image forming apparatus.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The present disclosure relates to the following aspects, for example.

According to a first aspect, an image forming apparatus includes a plurality of image bearers, a plurality of optical writing means, a plurality of developing means, a transfer member, a detection means, and a correction means. The plurality of image bearers include a first image bearer and a second image bearer different from the first image bearer. The plurality of optical writing means irradiate the plurality of image bearers with a plurality of light beams to write a plurality of latent images on the plurality of image bearers. The plurality of developing means develop the plurality of latent images written on the plurality of image bearers into a plurality of images. The plurality of images developed by the plurality of developing means are transferred to the transfer member. The detection means detects the plurality of images on the transfer member. The correction means corrects misalignment of the plurality of images based on a result of the detection. The correction means sequentially executes a first correction process and a second correction process. In the first correction process, based on a plurality of images developed on a first group of image bearers of the plurality of image bearers, the correction means corrects misalignment in relation to a plurality of images developed on the first image bearer. The first group of image bearers includes the first image bearer and the second image bearer. In the second correction process, based on a plurality of images developed on a second group of image bearers of the plurality of image bearers, the correction means corrects misalignment in relation to a plurality of images developed on the second image bearer. The second group of image bearers excludes the first image bearer and includes the second image bearer.

According to a second aspect, in the image forming apparatus of the first aspect, after the execution of the second correction process, an image forming process is executed to form a plurality of images excluding the plurality of images developed on the first image bearer of the plurality of image bearers.

According to a third aspect, in the image forming apparatus of the first or second aspect, the transfer member includes an intermediate transfer belt to which the plurality of images developed on the plurality of image bearers are first transferred. In the second correction process by the correction means, the first image bearer is separated from the intermediate transfer belt to transfer, to the intermediate transfer belt, a plurality of images excluding the plurality of images developed on the first image bearer.

According to a fourth aspect, in the plurality of images on the transfer member of the image forming apparatus of one of the first to third aspects, respective positions of the plurality of images developed on the first image bearer in the execution of the first correction process correspond to respective positions of the plurality of images developed on the second image bearer in the execution of the second correction process.

According to a fifth aspect, in the image forming apparatus of the third aspect, one of the plurality of image bearers located most upstream in a moving direction of the intermediate transfer belt and another one of the plurality of image bearers located most downstream in the moving direction of the intermediate transfer belt are switchable to each other.

According to a sixth aspect, an image misalignment correction method is performed by an image forming apparatus including a plurality of image bearers, a plurality of optical writing means, a plurality of developing means, and a transfer member. The plurality of image bearers include a first image bearer and a second image bearer different from the first image bearer. The plurality of optical writing means irradiate the plurality of image bearers with a plurality of light beams to write a plurality of latent images on the plurality of image bearers. The plurality of developing means develop the plurality of latent images written on the plurality of image bearers into a plurality of images. The plurality of images developed by the plurality of developing means are transferred to the transfer member. The image misalignment correction method includes detecting the plurality of images on the transfer member and correcting misalignment of the plurality of images based on a result of the detecting. The correcting includes first correcting and second correcting, which are sequentially executed. The first correcting includes correcting misalignment in relation to a plurality of images developed on the first image bearer based on a plurality of images developed on a first group of image bearers of the plurality of image bearers. The first group of image bearers includes the first image bearer and the second image bearer. The second correcting includes correcting misalignment in relation to a plurality of images developed on the second image bearer based on a plurality of images developed on a second group of image bearers of the plurality of image bearers. The second group of image bearers excludes the first image bearer and includes the second image bearer.

According to a seventh aspect, a non-transitory recording medium stores a plurality of instructions which, when executed by one or more processors forming an image forming apparatus, causes the processors to perform an image misalignment correction method. The image forming apparatus includes a plurality of image bearers, a plurality of optical writing means, a plurality of developing means, and a transfer member. The plurality of image bearers include a first image bearer and a second image bearer different from the first image bearer. The plurality of optical writing means irradiate the plurality of image bearers with a plurality of light beams to write a plurality of latent images on the plurality of image bearers. The plurality of developing means develop the plurality of latent images written on the plurality of image bearers into a plurality of images. The plurality of images developed by the plurality of developing means are transferred to the transfer member. The image misalignment correction method includes detecting the plurality of images on the transfer member and correcting misalignment of the plurality of images based on a result of the detecting. The correcting includes first correcting and second correcting, which are sequentially executed. The first correcting includes correcting misalignment in relation to a plurality of images developed on the first image bearer based on a plurality of images developed on a first group of image bearers of the plurality of image bearers. The first group of image bearers includes the first image bearer and the second image bearer. The second correcting includes correcting misalignment in relation to a plurality of images developed on the second image bearer based on a plurality of images developed on a second group of image bearers of the plurality of image bearers. The second group of image bearers excludes the first image bearer and includes the second image bearer.

The invention claimed is:

1. An image forming apparatus comprising:

a plurality of image bearers including a first image bearer that is a first photoconductor drum and a second image bearer that is a second photoconductor drum, the second image bearer being different from the first image bearer;

a plurality of scanners configured to irradiate the plurality of image bearers with a plurality of light beams to write a plurality of latent images on the plurality of image bearers;

a plurality of developing devices configured to develop the plurality of latent images written on the plurality of image bearers into a plurality of images;

a transfer belt to which the plurality of images developed by the plurality of developing devices are transferred;

a detector configured to detect the plurality of images on the transfer belt; and circuitry configured to execute a first correction process for correcting misalignment using a color of the first image bearer as a first reference color in relation to a plurality of images developed on the first image bearer based on a plurality of images developed on a first group of image bearers of the plurality of image bearers, the first group of image bearers including the first image bearer and the second image bearer, after execution of the first correction process, separate the first image bearer from the transfer belt, and in a state in which the first image bearer is separated from the transfer belt, execute a second correction process for correcting misalignment using a color of the second image bearer as a second reference color in relation to a plurality of images developed on the second image bearer based on a plurality of images developed on a second group of image bearers of the plurality of image bearers, the second group of image bearers excluding the first image bearer and including the second image bearer, the second reference color being different from the first reference color, wherein the circuitry is further configured to sequentially execute the first correction process and the second correction process before executing a subsequent image forming operation on a recording medium.

2. The image forming apparatus of claim 1, further comprising an intermediate transfer belt to which the plurality of images developed on the plurality of image bearers are first transferred, wherein in the second correction process, the first image bearer is separated from the intermediate transfer belt.

3. The image forming apparatus of claim 2, wherein one of the plurality of image bearers located most upstream in a moving direction of the intermediate transfer belt and another one of the plurality of image bearers located most downstream in the moving direction of the intermediate transfer belt are switchable to each other.

4. The image forming apparatus of claim 1, wherein in the plurality of images on the transfer belt, respective positions of the plurality of images developed on the first image bearer in the execution of the first correction process correspond to respective positions of the plurality of images developed on the second image bearer in the execution of the second correction process.

5. The image forming apparatus of claim 1, further comprising an intermediate transfer belt to which the plurality of images developed on the plurality of image bearers are first transferred, the intermediate transfer belt configured to move in a moving direction, wherein a color of an image bearer located most upstream in the moving direction of the intermediate transfer belt among the plurality of image bearers is used as the second reference color in the second correction process.

6. The image forming apparatus of claim 1, wherein after execution of the second correction process, the circuitry executes an image forming process to form a plurality of images excluding the plurality of images developed on the first image bearer of the plurality of image bearers.

7. An image misalignment correction method performed by an image forming apparatus, the image forming apparatus including a plurality of image bearers including a first image bearer that is a first photoconductor drum and a second image bearer that is a second photoconductor drum, the second image bearer being different from the first image bearer, a plurality of scanners configured to irradiate the plurality of image bearers with a plurality of light beams to write a plurality of latent images on the plurality of image bearers, a plurality of developing devices configured to develop the plurality of latent images written on the plurality of image bearers into a plurality of images, and a transfer belt to which the plurality of images developed by the plurality of developing devices are transferred, and the image misalignment correction method comprising:

detecting the plurality of images on the transfer belt;

executing first correction for correcting misalignment using a color of the first image bearer as a first reference color in relation to a plurality of images developed on the first image bearer based on a plurality of images developed on a first group of image bearers of the plurality of image bearers, the first group of image bearers including the first image bearer and the second image bearer;

after execution of the first correction, separating the first image bearer from the transfer belt; and in a state in which the first image bearer is separated from the transfer belt, executing second correction for correcting misalignment using a color of the second image bearer as a second reference color in relation to a plurality of images developed on the second image bearer based on a plurality of images developed on a second group of image bearers of the plurality of image bearers, the second group of image bearers excluding the first image bearer and including the second image bearer, the second reference color being different from the first reference color, wherein the first correction process and the second correction process are sequentially executed before executing a subsequent image forming operation on a recording medium.

8. A non-transitory recording medium storing a plurality of instructions which, when executed by one or more processors forming an image forming apparatus, causes the processors to perform an image misalignment correction method, the image forming apparatus including a plurality of image bearers including a first image bearer that is a first photoconductor drum and a second image bearer that is a second photoconductor drum, the second image bearer being different from the first image bearer, a plurality of scanners configured to irradiate the plurality of image bearers with a plurality of light beams to write a plurality of latent images on the plurality of image bearers, a plurality of developing devices configured to develop the plurality of latent images written on the plurality of image bearers into a plurality of images, and a transfer belt to which the plurality of images developed by the plurality of developing devices are transferred, and the image misalignment correction method comprising:

detecting the plurality of images on the transfer belt;

executing first correction for correcting misalignment using a color of the first image bearer as a first reference color in relation to a plurality of images developed on the first image bearer based on a plurality of images developed on a first group of image bearers of the plurality of image bearers, the first group of image bearers including the first image bearer and the second image bearer;

after execution of the first correction, separating the first image bearer from the transfer belt; and in a state in which the first image bearer is separated from the transfer belt, executing second correction for correcting misalignment using a color of the second image bearer as a second reference color in relation to a plurality of images developed on the second image bearer based on a plurality of images developed on a second group of image bearers of the plurality of image bearers, the second group of image bearers excluding the first image bearer and including the second image bearer, the second reference color being different from the first reference color, wherein the first correction process and the second correction process are sequentially executed before executing a subsequent image forming operation on a recording medium.

* * * * *